United States Patent
Furuhata et al.

(10) Patent No.: US 11,561,101 B2
(45) Date of Patent: Jan. 24, 2023

(54) PHYSICAL QUANTITY SENSOR, INERTIA MEASUREMENT DEVICE, VEHICLE POSITIONING DEVICE, ELECTRONIC APPARATUS, AND VEHICLE

(71) Applicant: Seiko Epson Corporation, Tokyo (JP)

(72) Inventors: Makoto Furuhata, Matsumoto (JP); Takayuki Kikuchi, Chino (JP); Kazuyuki Nagata, Minowa (JP)

(73) Assignee: SEIKO EPSON CORPORATION

( * ) Notice: Subject to any disclaimer, the term of this patent is extended or adjusted under 35 U.S.C. 154(b) by 973 days.

(21) Appl. No.: 16/145,280

(22) Filed: Sep. 28, 2018

(65) Prior Publication Data

US 2019/0101395 A1 Apr. 4, 2019

(30) Foreign Application Priority Data

Sep. 29, 2017 (JP) .............................. JP2017-190931

(51) Int. Cl.
   *G01C 21/28* (2006.01)
   *G01C 19/5733* (2012.01)
   *G01C 19/5747* (2012.01)
   *G01C 21/16* (2006.01)

(52) U.S. Cl.
   CPC ......... *G01C 21/28* (2013.01); *G01C 19/5733* (2013.01); *G01C 19/5747* (2013.01); *G01C 21/16* (2013.01)

(58) Field of Classification Search
   CPC ................ G01C 21/28; G01C 19/5733; G01C 19/5747; G01C 21/16
   See application file for complete search history.

(56) References Cited

U.S. PATENT DOCUMENTS

| | | | |
|---|---|---|---|
| 8,256,290 B2 | 9/2012 | Mao | |
| 8,459,110 B2 | 6/2013 | Cazzaniga et al. | |
| 2003/0131664 A1 | 7/2003 | Mochida et al. | |
| 2008/0066546 A1 | 3/2008 | Katsumata | |
| 2010/0107759 A1* | 5/2010 | Kato | G01C 19/5719 73/504.12 |
| 2013/0298673 A1* | 11/2013 | Takizawa | G01C 19/5762 73/504.12 |

(Continued)

FOREIGN PATENT DOCUMENTS

| | | |
|---|---|---|
| JP | 2000-097708 A | 4/2000 |
| JP | 2002-340561 A | 11/2002 |
| JP | 2004-163376 A | 6/2004 |

(Continued)

*Primary Examiner* — Herbert K Roberts
*Assistant Examiner* — Anthony W Megna Fuentes
(74) *Attorney, Agent, or Firm* — Harness, Dickey & Pierce, P.L.C.

(57) ABSTRACT

A physical quantity sensor includes a substrate, a movable body that includes a movable drive electrode, a movable detection electrode, and a connection portion for connecting the movable drive electrode and the movable detection electrode and is allowed to vibrate along a first axis with respect to the substrate, a fixed drive electrode that is fixed to the substrate, is disposed to face the movable drive electrode, and vibrates the movable body along the first axis, and a fixed monitor electrode that is fixed to the substrate, is disposed to face the movable detection electrode and detects vibration of the movable body along the first axis.

20 Claims, 16 Drawing Sheets

(56) References Cited

U.S. PATENT DOCUMENTS

2014/0373628 A1   12/2014   Balslink et al.

FOREIGN PATENT DOCUMENTS

| JP | 2008-076153 A | 4/2008 | |
|---|---|---|---|
| JP | 2013-181957 A | 9/2013 | |
| JP | 2013-217650 A | 10/2013 | |
| WO | WO-2016047166 A1 * | 3/2016 | ............. G01C 21/28 |

* cited by examiner

PHYSICAL QUANTITY SENSOR, INERTIA MEASUREMENT DEVICE, VEHICLE POSITIONING DEVICE, ELECTRONIC APPARATUS, AND VEHICLE

CROSS-REFERENCE TO RELATED APPLICATION

This nonprovisional application claims the benefit of Japanese Patent Application No. 2017-190931 filed Sep. 29, 2017, the entire disclosure of which is incorporated herein by reference.

BACKGROUND

1. Technical Field

The present invention relates to a physical quantity sensor, an inertia measurement device, a vehicle positioning device, an electronic apparatus, and a vehicle.

2. Related Art

For example, an angular velocity sensor described in JP-A-2013-181957 includes a substrate, a vibrator supported so as to be vibratable with respect to the substrate, a drive electrode for vibrating the vibrator, and a monitor electrode for monitoring vibration of the vibrator. The monitor electrode includes a movable monitor electrode provided on the vibrator and a fixed monitor electrode fixed to the substrate. When the vibrator vibrates, an electrostatic capacitance between the movable monitor electrode and the fixed monitor electrode changes and thus, it is possible to monitor vibration of the vibrator based on change in electrostatic capacitance.

However, in the angular velocity sensor of JP-A-2013-181957, the drive electrode and the monitor electrode are adjacent to each other. For that reason, crosstalk noise from the drive electrode is generated on the monitor electrode, and monitoring accuracy of the vibrator is deteriorated.

SUMMARY

An advantage of some aspects of the invention is to provide a physical quantity sensor having excellent monitoring accuracy, an inertia measurement device, a vehicle positioning device, an electronic apparatus, and a vehicle. The advantage can be achieved by the following configurations.

A physical quantity sensor according to an aspect of the invention includes a substrate, a movable body that includes a movable drive electrode, a movable detection electrode, and a connection portion for connecting the movable drive electrode and the movable detection electrode and is allowed to vibrate in a first direction with respect to the substrate, a fixed drive electrode that is fixed to the substrate, is disposed to face the movable drive electrode, and vibrates the movable body in the first direction, and a fixed monitor electrode that is fixed to the substrate, is disposed to face the movable detection electrode, and detects vibration of the movable body in the first direction.

With this configuration, it is possible to dispose the fixed monitor electrode as far as possible from the fixed drive electrode. For that reason, crosstalk noise from the drive electrode hardly occurs on the monitor electrode, and a physical quantity sensor having excellent monitoring accuracy can be obtained.

In the physical quantity sensor according to the aspect of the invention, it is preferable to include a movable monitor electrode that is disposed on the movable detection electrode and forms an electrostatic capacitance with the fixed monitor electrode.

With this configuration, vibration of the movable body can be monitored based on change in electrostatic capacitance.

In the physical quantity sensor according to the aspect of the invention, it is preferable that the fixed monitor electrode includes a first fixed monitor electrode and a second fixed monitor electrode, and when the movable body vibrates in the first direction, a gap between the movable monitor electrode and the first fixed monitor electrode and a gap between the movable monitor electrode and the second fixed monitor electrode change in opposite phases.

With this configuration, noise can be canceled by performing a differential operation on outputs from the first and second fixed monitor electrodes, and vibration of the movable body can be monitored more accurately.

In the physical quantity sensor according to the aspect of the invention, it is preferable that the fixed monitor electrode is disposed outside the movable detection electrode.

With this configuration, disposition of the fixed monitor electrodes is simplified.

In the physical quantity sensor according to the aspect of the invention, it is preferable that the movable detection electrode includes an opening, and the fixed monitor electrode is disposed inside the opening.

With this configuration, it is possible to reduce the size of the physical quantity sensor.

In the physical quantity sensor according to the aspect of the invention, it is preferable that the movable drive electrode is disposed between the fixed drive electrode and the fixed monitor electrode.

With this configuration, the fixed monitor electrode can be disposed farther away from the fixed drive electrode.

In the physical quantity sensor according to the aspect of the invention, it is preferable that a constant voltage is applied to the movable body.

This makes crosstalk noise from the drive electrode less likely to occur on the monitor electrode.

In the physical quantity sensor according to the aspect of the invention, it is preferable that the substrate includes a concave portion that is open to the main surface on the side of the movable body and is disposed to be overlapped with the movable body in plan view of the substrate, and the fixed monitor electrode is fixed to the main surface on the outside of the concave portion.

With this configuration, it is possible to bond the fixed monitor electrode and the substrate more reliably with a predetermined bonding strength.

An inertia measurement device according to another aspect of the invention includes the physical quantity sensor according to the aspect of the invention and a control circuit that controls driving of the physical quantity sensor.

With this configuration, it is possible to obtain the effect of the physical quantity sensor according to the aspect of the invention and to obtain an inertia measurement device with high reliability.

A vehicle positioning device according to another aspect of the invention includes the inertia measurement device according to the aspect of the invention, a reception unit that receives a satellite signal on which position information is superimposed from a positioning satellite, an acquisition unit that acquires position information of the reception unit based on the received satellite signal, a computation unit that computes an attitude of the vehicle based on inertia data output from the inertia measurement device, and a calculation unit that calculates a position of the vehicle by correcting the position information based on the calculated attitude.

With this configuration, it is possible to obtain the effect of the inertia measurement device and to obtain a vehicle positioning device with high reliability.

An electronic apparatus according to another aspect of the invention includes the physical quantity sensor according to the aspect of the invention, a control circuit and a correction circuit.

With this configuration, it is possible to obtain the effect of the physical quantity sensor and to obtain an electronic apparatus with high reliability.

A vehicle according to another aspect of the invention includes the physical quantity sensor according to the aspect of the invention and an attitude control unit.

With this configuration, it is possible to obtain the effect of the physical quantity sensor and to obtain a vehicle with high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, an inertia measurement device, a vehicle positioning device, an electronic apparatus, and a vehicle of the invention will be described in detail based on embodiments illustrated in the accompanying drawings.

First Embodiment

First, a physical quantity sensor according to a first embodiment of the invention will be described.

Figure 1:
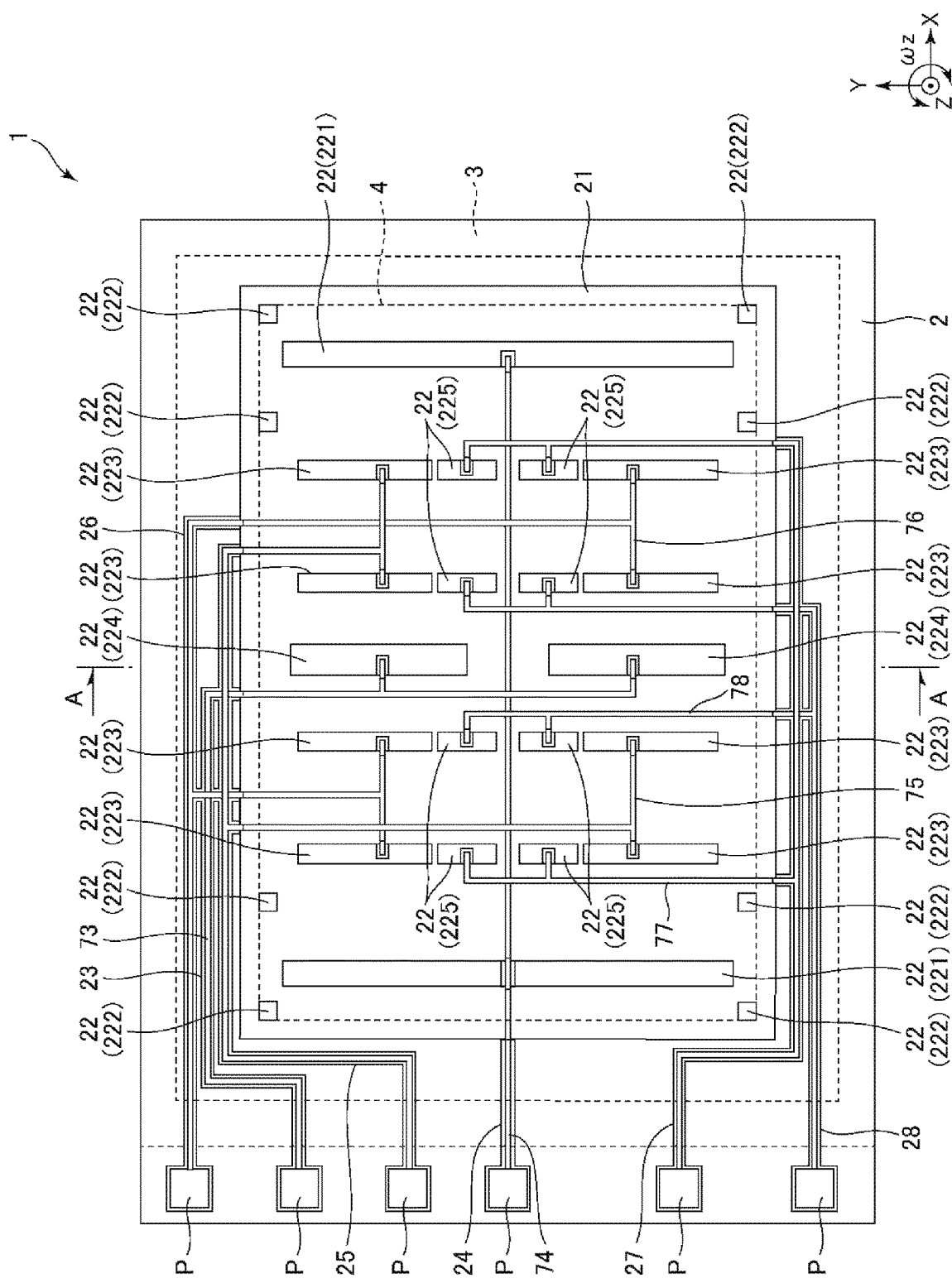
FIG. 1 is a plan view illustrating a physical quantity sensor according to a first embodiment of the invention.
Figure 2:
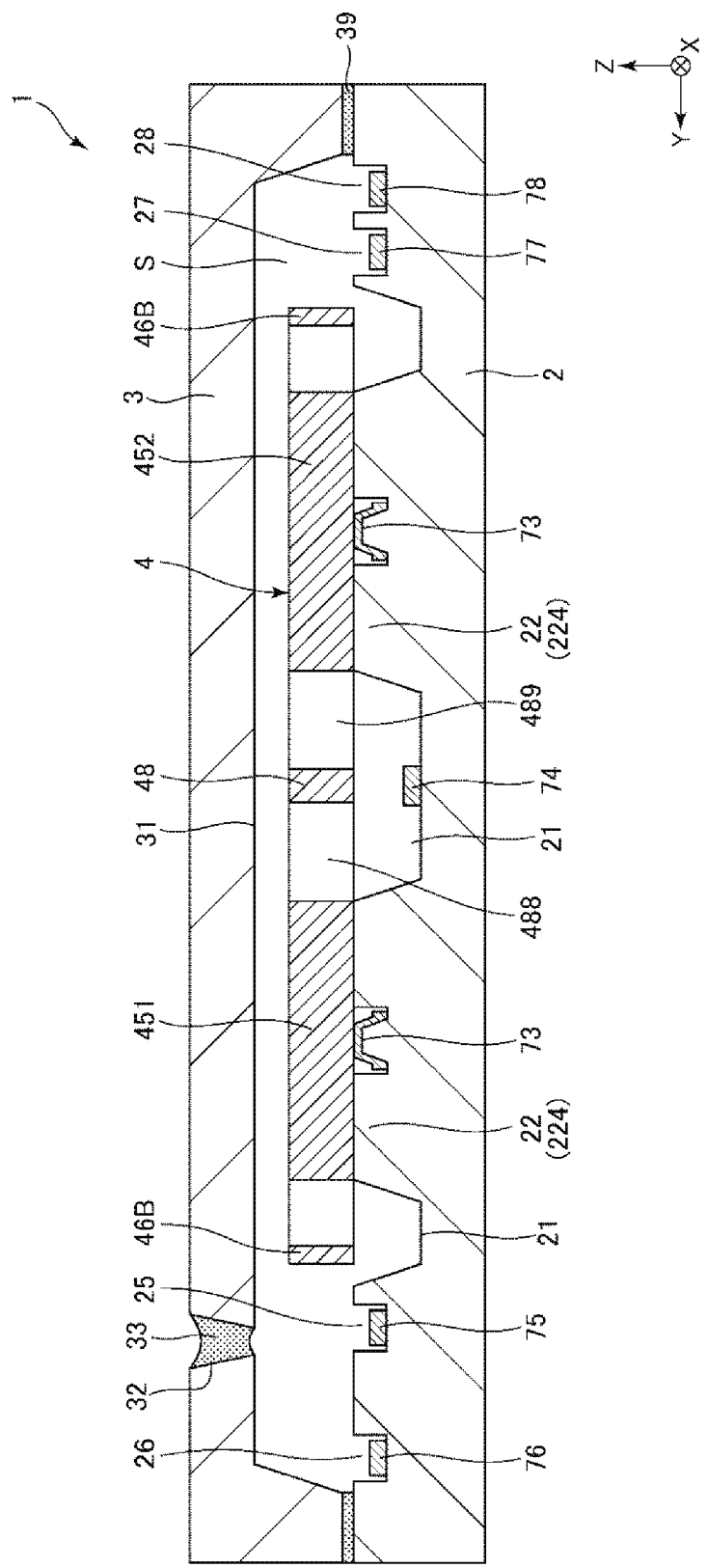
FIG. 2 is a cross-sectional view taken along line A-A in FIG. 1.
Figure 3:
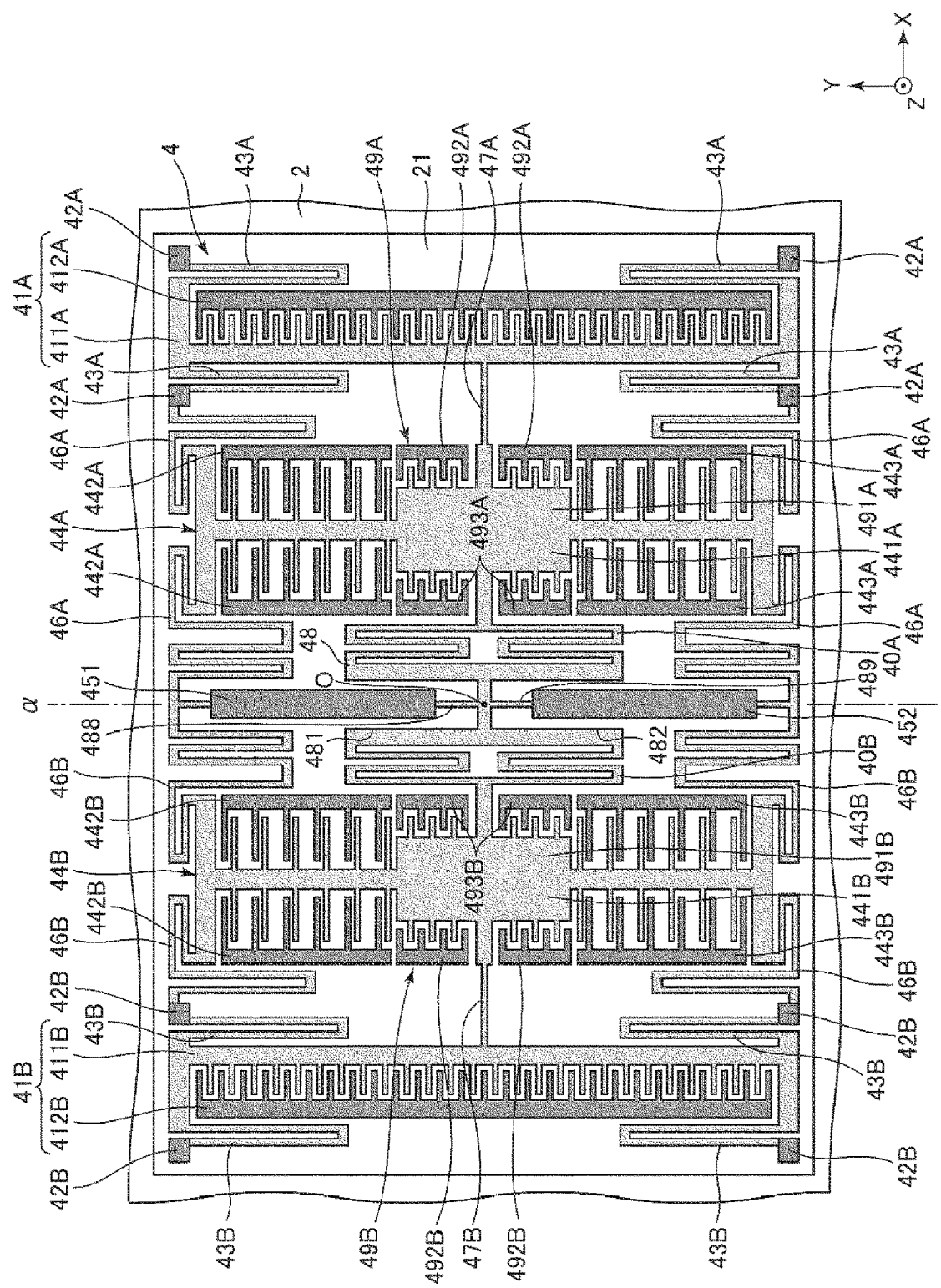
FIG. 3 is a plan view illustrating an element portion included in the physical quantity sensor of FIG. 1.
Figure 4:
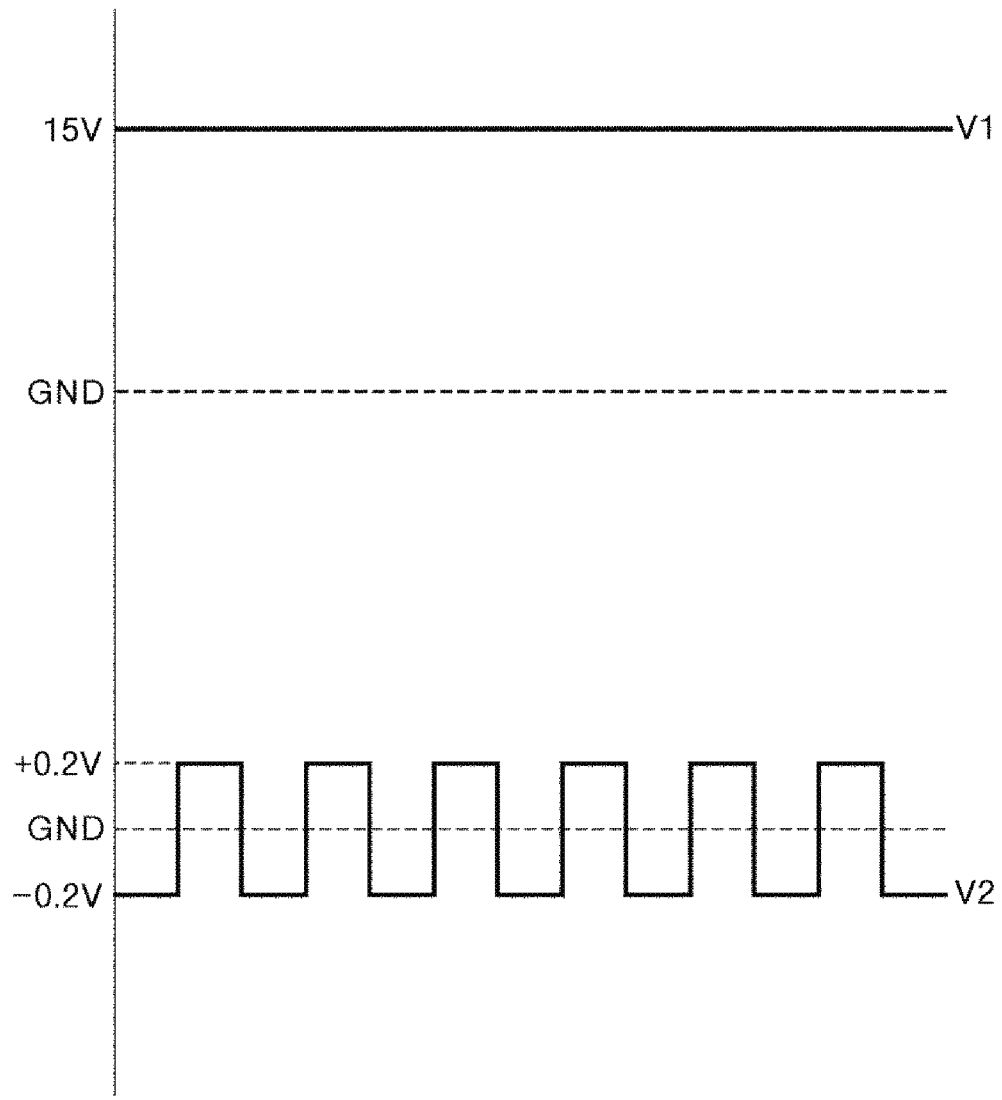
FIG. 4 is a diagram illustrating a voltage to be applied to the element portion.
Figure 5:
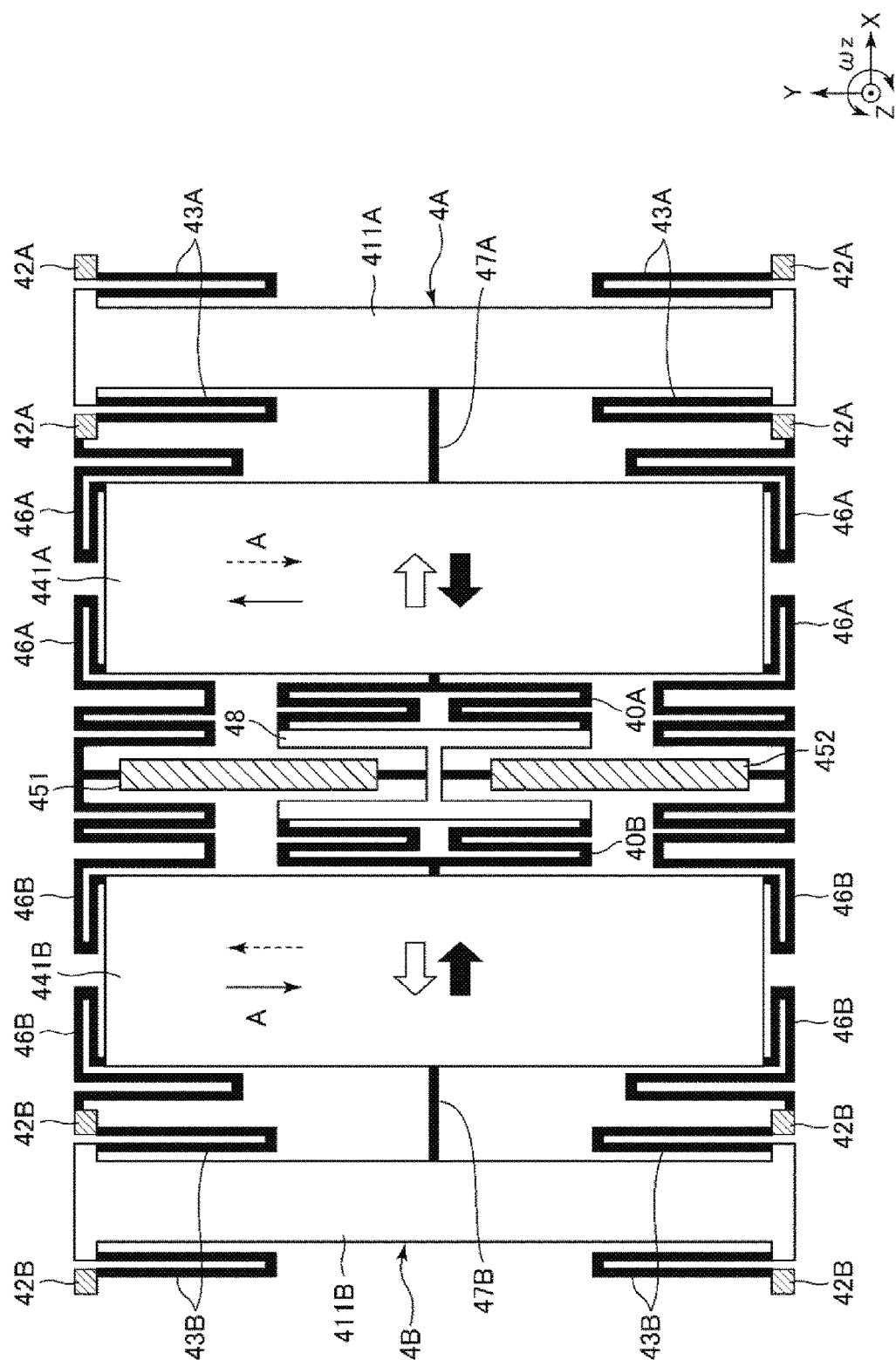
FIG. 5 is a schematic diagram for explaining a vibration mode of the element portion.

FIG. 1 is a plan view illustrating a physical quantity sensor according to a first embodiment of the invention. FIG. 2 is a cross-sectional view taken along line A-A in FIG. 1. FIG. 3 is a plan view illustrating the element portion included in the physical quantity sensor of FIG. 1. FIG. 4 is a diagram illustrating a voltage to be applied to the element portion. FIG. 5 is a schematic diagram for explaining a vibration mode of the element portion. In each drawing, the X-axis, Y-axis, and Z-axis are illustrated as three axes orthogonal to each other. A direction parallel to the X-axis is referred to as an "X-axis direction", a direction parallel to the Y-axis is referred to as a "Y-axis direction", and a direction parallel to the Z-axis is referred to as a "Z-axis direction". The tip end side of the arrow of each axis is also called "plus side", and the side opposite to the tip end side is also called "minus side". In addition, the plus side in the Z-axis direction is also referred to as "upper", and the minus side in the Z-axis direction is also referred to as "lower".

A physical quantity sensor 1 illustrated in FIG. 1 is an angular velocity sensor capable of detecting an angular velocity ωz around the Z-axis. The physical quantity sensor 1 includes a substrate 2, a lid 3, and an element portion 4.

As illustrated in FIG. 1, the substrate 2 is formed in a plate shape having a rectangular plan view shape. The substrate 2 includes a concave portion 21 which is open to the upper surface (main surface on the side of element portion 4). The concave portion 21 is disposed so as to be overlapped with the element portion 4 in plan view from the Z-axis direction and functions as a relief portion for preventing (suppressing) contact between the element portion 4 and the substrate 2. The substrate 2 includes a plurality of mounts 22 (221, 222, 223, 224, and 225) protruding from the bottom surface of the concave portion 21. The element portion 4 is bonded to the upper surface of these mounts 22. With this configuration, the element portion 4 is fixed to the substrate 2 in a state where contact with the substrate 2 is prevented. The substrate 2 includes grooves 23, 24, 25, 26, 27, and 28 which open to the upper surface.

As the substrate 2, for example, a glass substrate composed of glass materials (for example, borosilicate glass such as Tempax glass (registered trademark), Pyrex glass (registered trademark)) containing movable ions (alkali metal ion, hereinafter, represented by Na+) such as sodium ions (Na+), lithium ions (Li+) or the like can be used. With this configuration, for example, as will be described later, the substrate 2 and the element portion 4 can be subjected to anode bonding to be firmly bonded. Further, since the substrate 2 having light transmitting property can be obtained, the state of the element portion 4 can be visually recognized from the outside of the physical quantity sensor 1 via the substrate 2. However, the constituent material of the substrate 2 is not particularly limited, and a silicon substrate, a ceramic substrate, or the like may be used.

As illustrated in FIG. 1, wirings 73, 74, 75, 76, 77, and 78 are disposed in the grooves 23, 24, 25, 26, 27, and 28, respectively. The wirings 73, 74, 75, 76, 77, and are electrically connected to the element portion 4, respectively. One end portions of the wirings 73, 74, 75, 76, 77, and 78 are exposed to the outside of the lid 3, respectively, and function as electrode pads P that make electrical connection with external devices, respectively.

As illustrated in FIG. 1, the lid 3 is in a form of a plate shape having a rectangular plan view shape. As illustrated in FIG. 2, the lid 3 includes a concave portion 31 which is open to the lower surface. The lid 3 is bonded to the upper surface of the substrate 2 so as to accommodate the element portion 4 in the concave portion 31. An accommodation space S for accommodating the element portion 4 is formed inside the lid 3 and the substrate 2.

As illustrated in FIG. 2, the lid 3 includes a communication hole 32 that communicates between the inside and the outside of the accommodation space S. For that reason, it is possible to replace the accommodation space S with a desired atmosphere via the communication hole 32. A sealing member 33 is disposed in the communication hole 32, and the communication hole 32 is hermetically sealed by the sealing member 33. It is preferable that the accommodation space S is in a reduced pressure state, particularly in a vacuum state. With this configuration, the viscous resistance decreases, and the element portion 4 can vibrate efficiently.

As such a lid 3, for example, a silicon substrate can be used. However, the lid 3 is not particularly limited, and for example, a glass substrate or a ceramic substrate may be used. Although a method of bonding the substrate 2 and the lid 3 is not particularly limited and may be appropriately selected depending on materials of the substrate 2 and the lid 3 body, for example, anodic bonding, active bonding for bonding the bonding surfaces activated by plasma irradiation, bonding with a bonding material such as glass frit, and diffusion bonding for bonding the metal films formed on the upper surface of the substrate 2 and the lower surface of the lid 3 and the like are included. In the first embodiment, the substrate 2 and the lid 3 body are bonded via a glass frit 39 (low melting point glass).

The element portion 4 is disposed in the accommodation space S and is bonded to the upper surface of the mount 22. The element portion 4 can be formed by patterning a conductive silicon substrate doped with impurities such as phosphorus (P), boron (B) or the like, by a dry etching method (silicon deep etching). Hereinafter, the element portion 4 will be described in detail. In the following description, a straight line intersecting the center 0 of the element portion 4 and extending in the Y-axis direction in plan view from the Z-axis direction is also referred to as an "imaginary straight line α".

As illustrated in FIG. 3, the element portion 4 is formed symmetrically with respect to the imaginary straight line α. The element portion 4 includes drive portions 41A and 41B disposed on both sides of the imaginary straight line α. The drive portion 41A includes a movable drive electrode 411A provided with a plurality of electrode fingers disposed in a comb teeth-shape and a fixed drive electrode 412A provided with a plurality of electrode fingers disposed in a comb teeth shape and disposed to be engaged with the electrode fingers of the movable drive electrode 411A. Similarly, the drive portion 41B includes a movable drive electrode 411B provided with a plurality of electrode fingers disposed in a comb teeth-shape and a fixed drive electrode 412B provided with a plurality of electrode fingers disposed in a comb teeth shape and disposed to be engaged with the electrode fingers of the movable drive electrode 411B.

The fixed drive electrode 412A is positioned further outside (the side far from the imaginary straight line α) than the movable drive electrode 411A, and the fixed drive electrode 412B is positioned further outside (side far from the imaginary straight line α) than the movable drive electrode 411B. The fixed drive electrodes 412A and 412B are bonded to the upper surface of the mount 221, respectively, and are fixed to the substrate 2. The movable drive electrodes 411A and 411B are electrically connected to the wiring 73, respectively, and the fixed drive electrodes 412A and 412B are electrically connected to the wiring 74, respectively.

The element portion 4 includes four fixed portions 42A disposed around the drive portion 41A and four fixed portions 42B disposed around the drive portion 41B. Each of the fixed portions 42A and 42B is bonded to the upper surface of the mount 222 and fixed to the substrate 2.

The element portion 4 includes four drive springs 43A for connecting the respective fixed portions 42A and the movable drive electrode 411A and four drive springs 43B for connecting the fixed portions 42B and the movable drive electrode 411B. Each of the drive springs 43A is elastically deformed in the X-axis direction so that displacement of the movable drive electrode 411A in the X-axis direction is permitted and each of the drive springs 43B is elastically deformed in the X-axis direction so that displacement of the movable drive electrode 411B in the X-axis direction is permitted.

To vibrate the movable drive electrodes 411A and 411B, for example, a voltage V1 illustrated in FIG. 4 is applied to the movable drive electrodes 411A and 411B via the wiring 73 and a voltage V2 illustrated in FIG. 4 is applied to the fixed drive electrodes 412A and 412B via the wiring 74. The voltage V1 is a constant voltage of about 15 V which is larger than the GND reference (for example, a potential of approximately 0.9 V), and the voltage V2 is a rectangular wave centered on the GND reference.

With this configuration, electrostatic attractive forces are generated between the movable drive electrode 411A and the fixed drive electrode 412A and between the movable drive electrode 411B and the fixed drive electrode 412B, respectively, the movable drive electrode 411A vibrates in the X-axis direction while elastically deforming the drive spring 43A in the X-axis direction, and the movable drive electrode 411B vibrates in the X-axis direction while elastically deforming the drive spring 43B in the X-axis direction. As described above, since the drive portions 41A and 41B are disposed symmetrically with respect to the imaginary straight line α, the movable drive electrodes 411A and 411B are vibrated in opposite phases in the X-axis direction so as to approach and separate from each other. For that reason, vibrations of the movable drive electrodes 411A and 411B are canceled out, and vibration leakage can be reduced. In the following description, this vibration mode is also referred to as a "drive vibration mode".

The voltages V1 and V2 are not particularly limited as long as the drive vibration mode can be excited. In the physical quantity sensor 1 of the first embodiment, although an electrostatic drive method is used in which the drive vibration mode is excited by electrostatic attractive force, a method of excitation is not particularly limited, and for example, a piezoelectric drive method, an electromagnetic drive method using a Lorentz force of a magnetic field, or the like can also be applied.

The element portion 4 includes detection portions 44A and 44B disposed between the drive portions 41A and 41B.

The detection portion 44A includes a movable detection electrode 441A which is provided with a plurality of electrode fingers disposed in a comb teeth shape and fixed detection electrodes 442A and 443A which are provided with the plurality of electrode fingers disposed in a comb teeth shape and disposed to engage with the electrode fingers of the movable detection electrode 441A. The fixed detection electrodes 442A and 443A are disposed to be aligned in the Y-axis direction, the fixed detection electrode 442A is positioned on the plus side in the Y-axis direction and the fixed detection electrode 443A is positioned on the minus side in the Y-axis direction with respect to the center of the movable detection electrode 441A. The fixed detection electrodes 442A and 443A are disposed in pairs so as to sandwich the movable detection electrode 441A from both sides in the X-axis direction.

Similarly, the detection portion 44B includes a movable detection electrode 441B which is provided with a plurality of electrode fingers disposed in a comb teeth shape and fixed detection electrodes 442B and 443B which are disposed to engage with the electrode fingers of the movable detection electrode 441B provided with the plurality of electrode fingers disposed in a comb teeth shape. The fixed detection electrodes 442B and 443B are disposed to be aligned in the Y-axis direction, the fixed detection electrode 442B is positioned on the plus side in the Y-axis direction and the fixed detection electrode 443B is positioned on the minus side in the Y-axis direction with respect to the center of the movable detection electrode 441B. The fixed detection electrodes 442B and 443B are disposed in pairs so as to sandwich the movable detection electrodes 441B from both sides in the X-axis direction.

The fixed detection electrodes 442A, 443A, 442B, and 443B are respectively bonded to the upper surface of the mount 223 and fixed to the substrate 2.

Each of the movable detection electrodes 441A and 441B is electrically connected to the wiring 73, each of the fixed detection electrodes 442A and 443B is electrically connected to the wiring 75, and each of the fixed detection electrodes 443A and 442B is electrically connected to the wiring 76. The wirings 75 and 76 are connected to a QV amplifier (charge voltage conversion circuit), respectively. When the physical quantity sensor 1 is driven, an electrostatic capacitance Ca is formed between the movable detection electrode 441A and the fixed detection electrode 442A and between the movable detection electrode 441B and the fixed detection electrode 443B, and an electrostatic capacitance Cb is formed between the movable detection electrode 441A and the fixed detection electrode 443A and between the movable detection electrode 441B and the fixed detection electrode 442B.

The element portion 4 includes two fixed portions 451 and 452 disposed between the detection portions 44A and 44B. The fixed portions 451 and 452 are respectively bonded to the upper surface of the mount 224 and fixed to the substrate 2. The fixed portions 451 and 452 are aligned in the Y-axis direction and is disposed to be spaced apart from each other. In the first embodiment, the movable drive electrodes 411A and 411B and the movable detection electrodes 441A and 441B are electrically connected to the wiring 73 via the fixed portions 451 and 452.

The element portion 4 includes four detection springs 46A for coupling the movable detection electrode 441A and the fixed portions 42A, 451, and 452, and four detection springs 46B for coupling the movable detection electrode 441B and the fixed portions 42B, 451, and 452. Each of the detection springs 46A is elastically deformed in the X-axis direction so that displacement of the movable detection electrode 441A in the X-axis direction is permitted and each of the detection springs 46A is elastically deformed in the Y-axis direction so that displacement of the movable detection electrode 441A in the Y-axis direction is permitted. Similarly, each of the detection springs 46B is elastically deformed in the X-axis direction so that displacement of the movable detection electrode 441B in the X-axis direction is permitted and each of the detection springs 46B is elastically deformed in the Y-axis direction so that displacement of the movable detection electrode 441B in the Y-axis direction is permitted.

The element portion 4 includes a beam 47A which is positioned between the movable drive electrode 411A and the movable detection electrode 441A and connects the movable drive electrode 411A and the movable detection electrode 441A and includes a beam 47B which is positioned between the movable drive electrode 411B and the movable detection electrode 441B and connects the movable drive electrode 411B and the movable detection electrode 441B. For that reason, as illustrated in FIG. 5, in the drive vibration mode, the movable detection electrodes 441A and 441B also vibrate in opposite phases in the X-axis direction together with the movable drive electrodes 411A and 411B. In other words, in the drive vibration mode, the movable body 4A which is an aggregate of the movable drive electrode 411A, the movable detection electrode 441A, and the beam 47A, the movable body 4B which is an aggregate of the movable drive electrode 411B, the movable detection electrode 441B, and the beam 47B vibrate in opposite phases in the X-axis direction.

When the angular velocity ωz is applied to the physical quantity sensor 1 during driving in the drive vibration mode as described above, the movable detection electrodes 441A and 441B vibrate (this vibration is also referred to as "detection vibration mode") in opposite phases in the Y-axis direction while elastically deforming the detection springs 46A and 46B in the Y-axis direction as indicated by an arrow A in FIG. 5 by the Coriolis force. In the detection vibration mode, since the movable detection electrodes 441A and 441B vibrate in the Y-axis direction, the gap between the movable detection electrode 441A and the fixed detection electrodes 442A and 443A and the gap between the movable detection electrode 441B and the fixed detection electrodes 442B and 443B change and the electrostatic capacitances Ca and Cb change, respectively, accompanying the gap change. For that reason, the angular velocity ωz can be obtained based on changes in the electrostatic capacitances Ca and Cb.

In the detection vibration mode, when the electrostatic capacitance Ca increases, the electrostatic capacitance Cb decreases, and on the contrary, when the electrostatic capacitance Ca decreases, the electrostatic capacitance Cb increases. For that reason, by performing difference computation (subtraction processing: Ca−Cb) between a detection signal (signal corresponding to magnitude of the electrostatic capacitance Ca) obtained from a QV amplifier connected to the wiring 75 and a detection signal (signal corresponding to magnitude of the electrostatic capacitance Cb) obtained from the QV amplifier connected to the wiring 76, noise can be canceled, and the angular velocity ωz can be detected more accurately.

Further, as illustrated in FIG. 3, the element portion 4 includes a frame 48 positioned at the center portion (between detection portions 44A and 44B) thereof. The frame 48 has an "H" shape and includes a defective portion 481 (concave portion) positioned on the plus side in the Y-axis direction and a defective portion 482 (concave portion) positioned on the minus side in the Y-axis direction. A fixed portion 451 is disposed inside and outside the defective portion 481, and the fixed portion 452 is disposed inside and outside the defective portion 482. With this configuration, the fixed portions 451 and 452 can be formed long in the Y-axis direction, a bonding area with the substrate 2 is increased correspondingly, and bonding strength between the substrate 2 and the element portion 4 is increased.

The element portion 4 includes a frame spring 488 which is positioned between the fixed portion 451 and the frame 48 and connects these components, and a frame spring 489 which is positioned between the fixed portion 452 and the frame 48 and connects these components. The frame springs 488 and 489 extend in the Y-axis direction, respectively, and are elastically deformable in the X-axis direction.

The element portion 4 includes a connection spring 40A which is positioned between the frame 48 and the movable detection electrode 441A and connects these components and a connection spring 40B which is positioned between the frame 48 and the movable detection electrode 441B and connects these components. The connection spring 40A supports the movable detection electrode 441A together with the detection spring 46A, and the connection spring 40B supports the movable detection electrode 441B together with the detection spring 46B. With this configuration, the movable detection electrodes 441A and 441B can be supported in a stable attitude, and unnecessary vibration (spurious) of the movable detection electrodes 441A and 441B can be reduced.

The element portion 4 includes monitor portions 49A and 49B for detecting vibration states of the movable drive electrodes 411A and 411B in the drive vibration mode.

The monitor portion 49A includes a movable monitor electrode 491A which is disposed on the movable detection electrode 441A and includes a plurality of electrode fingers disposed in a comb-teeth shape, and fixed monitor electrodes 492A and 493A which are provided with a plurality of electrode fingers disposed in a comb-teeth shape and disposed to be engaged with the electrode fingers of the movable monitor electrode 491A.

The fixed monitor electrodes 492A and 493A are disposed outside the movable detection electrode 441A, respectively. Specifically, the fixed monitor electrode 492A is positioned on the plus side in the X-axis direction with respect to the movable monitor electrode 491A, and the fixed monitor electrode 493A is positioned on the minus side in the X-axis direction with respect to the movable monitor electrode 491A. For that reason, if the movable detection electrode 441A is displaced to the plus side in the X-axis direction, the gap between the movable monitor electrode 491A and the fixed monitor electrode 492A is reduced, and the gap between the movable monitor electrode 491A and the fixed monitor electrode 493A widens. In contrast, if the movable detection electrode 441A is displaced to the minus side in the X-axis direction, the gap between the movable monitor electrode 491A and the fixed monitor electrode 492A widens and the gap between the movable monitor electrode 491A and the fixed monitor electrode 493A is reduced.

Further, a pair of fixed monitor electrodes 492A is disposed with the beam 47A interposed therebetween, and a pair of fixed monitor electrodes 493A is disposed with the connection spring 40A interposed therebetween.

Similarly, the monitor portion 49B includes a movable monitor electrode 491B disposed on the movable detection electrode 441B and provided with a plurality of electrode fingers disposed in a comb teeth shape, and fixed monitor electrodes 492B and 493B which are provided with a plurality of electrode fingers disposed in a comb teeth shape and disposed to be engaged with the electrode fingers of the movable monitor electrode 491B.

In addition, the fixed monitor electrodes 492B and 493B are disposed outside the movable detection electrode 441B, respectively. Specifically, the fixed monitor electrode 492B is positioned on the minus side in the X-axis direction with respect to the movable monitor electrode 491B, and the fixed monitor electrode 493B is positioned on the plus side in the X-axis direction with respect to the movable monitor electrode 491B. For that reason, if the movable detection electrode 441B is displaced to the minus side in the X-axis direction, the gap between the movable monitor electrode 491B and the fixed monitor electrode 492B is reduced and the gap between the movable monitor electrode 491B and the fixed monitor electrode 493B widens. In contrast, if the movable detection electrode 441B is displaced to the plus side in the X-axis direction, the gap between the movable monitor electrode 491B and the fixed monitor electrode 492B widens, and the gap between the movable monitor electrode 491B and the fixed monitor electrode 493B is reduced.

A pair of fixed monitor electrodes 493B is disposed with a connection spring 40B interposed therebetween, and a pair of fixed monitor electrodes 492B is disposed with a beam 47B sandwiched therebetween.

These fixed monitor electrodes 492A, 493A, 492B, and 493B are bonded to the upper surface of the mount 225, respectively, and fixed to the substrate 2. The movable monitor electrodes 491A and 491B are electrically connected to the wiring 73, respectively, the fixed monitor electrodes 492A and 492B are electrically connected to the wiring 77, respectively, and the fixed monitor electrodes 493A and 493B are electrically connected to the wiring 78, respectively. The wirings 77 and 78 are connected to the QV amplifier (electric charge voltage conversion circuit), respectively. When the physical quantity sensor 1 is driven, an electrostatic capacitance Cc is formed between the movable monitor electrode 491A and the fixed monitor electrode 492A and between the movable monitor electrode 491B and the fixed monitor electrode 492B and an electrostatic capacitance Cd is formed between the movable monitor electrode 491A and the fixed monitor electrode 493A and the movable monitor electrode 491B and the fixed monitor electrode 493B.

As described above, in the drive vibration mode, since the movable detection electrodes 441A and 441B vibrate in the X-axis direction, the gap between the movable monitor electrode 491A and the fixed monitor electrodes 492A and 493A and the gap between the movable monitor electrode 491B and the fixed monitor electrodes 492B and 493B change, respectively, and the electrostatic capacitances Cc and Cd change, respectively, according to the gap changes. For that reason, it is possible to detect the vibration state (in particular, amplitude in the X-axis direction) of the movable bodies 4A and 4B based on changes in the electrostatic capacitances Cc and Cd.

In the drive vibration mode, when the electrostatic capacitance Cc increases, the electrostatic capacitance Cd decreases, and on the contrary, when the electrostatic capacitance Cc decreases, the electrostatic capacitance Cd increases. For that reason, by performing difference computation (subtraction processing: Cc−Cd) between a detection signal (signal corresponding to magnitude of the electrostatic capacitance Cc) output from the QV amplifier connected to the wiring 77 and a detection signal (signal corresponding to magnitude of the electrostatic capacitance Cd) output from the QV amplifier connected to the wiring 78, noise can be canceled out and the vibration state of the movable bodies 4A and 4B can be detected more accurately.

The vibration state (amplitude) of the movable bodies 4A and 4B detected using the outputs from the monitor portions 49A and 49B is fed back to a drive circuit that applies a voltage V2 to the movable bodies 4A and 4B. The drive circuit changes the frequency and the duty ratio of the voltage V2 so that amplitudes of the movable bodies 4A and 4B become target values. With this configuration, the movable bodies 4A and 4B can be more effectively vibrated and detection accuracy of the angular velocity ωz is improved.

The physical quantity sensor 1 has been described as above. As described above, the physical quantity sensor 1 includes the substrate 2, the movable body 4A (4B) which includes the movable drive electrode 411A (411B), the movable detection electrode 441A (441B), and the beam 47A (47B) serving as a connection portion for connecting the movable drive electrode 411A (411B) to the movable detection electrode 441A (441B) and is able to vibrate in the X-axis direction (first direction) with respect to the substrate 2, the fixed drive electrode 412A (412B) which is fixed to the substrate 2, is disposed to face the movable drive electrode 411A (411B) and vibrates the movable body 4A (4B) in the X-axis direction, and the fixed monitor electrodes 492A and 493A (492B and 493B) which are fixed to the substrate 2, are disposed to face the movable detection electrodes 441A (441B), and detect vibration of the movable body 4A (4B) in the X-axis direction. As such, in the physical quantity sensor 1, the fixed drive electrode 412A (412B) is disposed to face the movable drive electrode 411A (411B), while the fixed monitor electrodes 492A and 493A (492B and 493B) are disposed to face the movable detection electrode 441A (441B). For that reason, the fixed monitor electrodes 492A and 493A (492B and 493B) can be disposed as far as possible from the fixed drive electrode 412A (412B). As a result, occurrence of crosstalk noise from the fixed drive electrode 412A (412B) on the fixed monitor electrodes 492A and 493A (492B and 493B) can be effectively suppressed and vibration of the movable body 4A (4B) can be accurately monitored.

Although the fixed monitor electrodes 492A and 493A (492B and 493B) are disposed to be aligned with the fixed detection electrodes 442A and 443A (442B and 443B), the signals output from the fixed detection electrodes 442A and 443A (442B and 443B) are very weak with respect to the voltage V1 applied to the fixed drive electrodes 412A (412B). For that reason, crosstalk noise from the fixed detection electrodes 442A and 443A (442B and 443B) on the fixed monitor electrodes 492A and 493A (492B and 493B) has almost no influence on monitoring and can be substantially ignored.

As described above, the physical quantity sensor 1 includes the movable monitor electrode 491A (491B) which is disposed on the movable detection electrode 441A (441B) and forms electrostatic capacitances Cc and Cd between the movable monitor electrode 491A (491B) and fixed monitor electrodes 492A and 493A (492B and 493B). With this configuration, it is possible to relatively easily monitor vibration of the movable body 4A (4B) based on changes in the electrostatic capacitances Cc and Cd.

As described above, the fixed monitor electrode includes the fixed monitor electrode 492A (492B) as a first fixed monitor electrode and the fixed monitor electrode 493A (493B) as a second fixed monitor electrode. When the movable body 4A (4B) vibrates in the X-axis direction, the gap between the movable monitor electrode 491A (491B) and the gap between the movable monitor electrode 491A (491B) and the fixed monitor electrode 493A (493B) change in opposite phases. That is, if the gap between the movable monitor electrode 491A (491B) and the fixed monitor electrode 492A (492B) is reduced, the gap between the movable monitor electrode 491A (491B) and the fixed monitor electrode 493A (493B) widens, and in contrast, when the gap between the movable monitor electrode 491A (491B) and the fixed monitor electrode 492A (492B) widens, the gap between the movable monitor electrode 491A (491B) and the fixed monitor electrode 493A (493B) is reduced. With this configuration, noise can be canceled out by performing a differential operation (subtraction processing) on the detection signal obtained from the fixed monitor electrode 492A (492B) and the detection signal obtained from the fixed monitor electrode 493A (493B), and the vibration state of the movable bodies 4A and 4B can be detected more accurately.

As described above, in the physical quantity sensor 1, the fixed monitor electrodes 492A and 493A (492B and 493B) are disposed outside the movable detection electrode 441A (441B). With this configuration, the disposition arrangement of the fixed monitor electrodes 492A and 493A (492B and 493B) is simplified.

As described above, in the physical quantity sensor 1, the movable drive electrode 411A (411B) is disposed between the fixed drive electrode 412A (412B) and the fixed monitor electrodes 492A and 493A (492B and 493B). In other words, the fixed monitor electrodes 492A and 493A (492B and 493B) are positioned on the side opposite to the fixed drive electrode 412A (412B) with respect to the movable drive electrode 411A (411B). With this configuration, the fixed monitor electrodes 492A and 493A (492B and 493B) can be disposed further away from the fixed drive electrode 412A (412B). For that reason, occurrence of crosstalk noise from the fixed drive electrodes 412A (412B) on the fixed monitor electrodes 492A and 493A (492B and 493B) can be suppressed more effectively.

As described above, in the physical quantity sensor 1, the voltage V1 which is a constant voltage is applied to the movable body 4A (4B). With this configuration, the movable bodies 4A and 4B can exhibit a shielding effect of suppressing crosstalk from the fixed drive electrode 412A (412B). For that reason, occurrence of crosstalk noise from the fixed drive electrodes 412A (412B) on the fixed monitor electrodes 492A and 493A (492B and 493B) can be more effectively suppressed.

Although the physical quantity sensor 1 of the embodiment has been described as above, the configuration of the physical quantity sensor 1 is not particularly limited. For example, in the first embodiment, although the monitor portion 49A includes the fixed monitor electrodes 492A and 493A, one of the fixed monitor electrodes 492A and 493A may be omitted or another fixed monitor electrode may be further provided. This also applies to the monitor portion 49B.

Second Embodiment

Next, a physical quantity sensor according to a second embodiment of the invention will be described.

Figure 6:
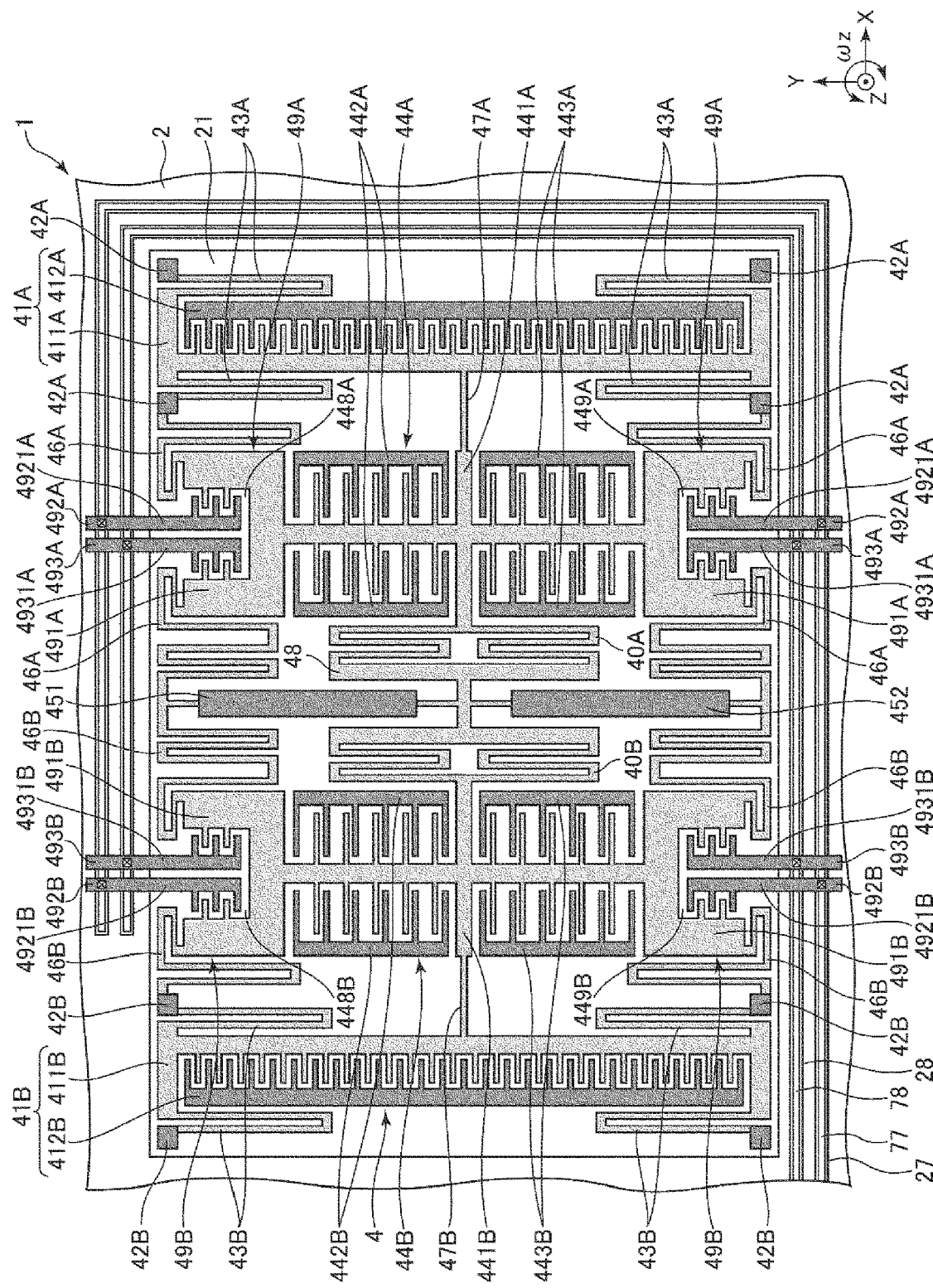
FIG. 6 is a plan view illustrating an element portion of a physical quantity sensor according to a second embodiment of the invention.

FIG. 6 is a plan view illustrating an element portion of a physical quantity sensor according to a second embodiment.

The physical quantity sensor 1 according to the second embodiment is mainly the same as the physical quantity sensor 1 according to the first embodiment described above except that the configuration of the element portion 4 (especially, monitor portions 49A and 49B) is different.

In the following description, regarding the physical quantity sensor 1 of the second embodiment, description will be mainly made on the differences from the first embodiment described above, and description of similar matters will be omitted. In FIG. 6, the same reference numerals are given to the same configurations as those of the first embodiment described above.

As illustrated in FIG. 6, openings 448A and 449A are formed in the movable detection electrode 441A. The opening 448A is constituted by a concave portion (cutout) which is open to the end portion on the plus side in the Y-axis direction of the movable detection electrode 441A, and the opening 449A is constituted by a concave portion (cutout) which is open to the end portion on the minus side in the Y-axis direction of the movable detection electrode 441A. Electrode fingers of the movable monitor electrode 491A protrude toward the inside of each of the openings 448A and 449A from both sides of each of the openings 448A and 449A. In addition, a pair of fixed monitor electrodes 492A and 493A and another pair of fixed monitor electrodes 492A and 493A are provided, one of the pairs is disposed in the opening 448A and the other of the pairs is disposed in the opening 449A. As such, the fixed monitor electrodes 492A and 493A are disposed inside the openings 448A and 449A so as to make it possible to reduce the size of the element portion 4.

Similarly, openings 448B and 449B are formed in the movable detection electrode 441B. The opening 448B is constituted by a concave portion that is open to the end portion on the plus side in the Y-axis direction of the movable detection electrode 441B and the opening 449B is constituted by a concave portion that is open to the end portion on the minus side in the Y-axis direction of the movable detection electrode 441B. Electrode fingers of the movable monitor electrode 491B protrude toward the inside of each of the openings 448B and 449B from both sides of each of the openings 448B and 449B. In addition, a pair of fixed monitor electrodes 492B and 493B and another pair of fixed monitor electrodes 492B and 493B are provided, one of the pairs is disposed in the opening 448B and the other of the pairs is disposed in the opening 449B.

Each fixed monitor electrode 492A includes a support portion 4921A for supporting the electrode fingers, each fixed monitor electrode 493A includes a support portion 4931A for supporting the electrode fingers, each fixed monitor electrode 492B includes a support portion 4921B for supporting the electrode fingers, and each fixed monitor electrode 493B includes a support portion 4931B for supporting the electrode fingers. These supporting portions 4921A, 4931A, 4921B, and 4931B extend to the outside of the concave portion 21, respectively, and are bonded to the upper surface of the substrate 2 outside the concave portion 21. In order to correspond to this configuration, in the second embodiment, the mount 225 that supports each of the fixed monitor electrodes 492A, 493A, 492B and 493B in the first embodiment described above is omitted.

Here, in the first embodiment described above, the fixed monitor electrodes 492A, 493A, 492B, and 493B are electrically connected to the wiring 77 or the wiring 78 on the mount 225, respectively. In such a configuration, it is difficult to position the mount 225 and the fixed monitor electrodes 492A, 493A, 492B, and 493B, and misalignment between the mount 225 and the fixed monitor electrodes 492A, 493A, 492B, and 493B is liable to occur. Since the mount 225 is small, it is difficult to form the mount 225, and the mount 225 may not be formed into a desired shape in some cases. For that reason, there is a concern that the bonding strength between the mount 225 and the fixed monitor electrodes 492A, 493A, 492B, and 493B is lowered, for example, or failure occurs in electrical connection between the fixed monitor electrodes 492A, 493A, 492B, and 493B and the wirings 77 and 78.

In response to such a problem, in the second embodiment, the fixed monitor electrodes 492A, 493A, 492B, and 493B are respectively bonded (fixed) to the upper surface of the substrate 2 on the outside of the concave portion 21. For that reason, problems such as misalignment and difficulty in formation of the mount 225 as described above cannot occur and the fixed monitor electrodes 492A, 493A, 492B, and 493B and the substrate 2 can be more reliably bonded with the designed strength.

Each of the fixed monitor electrodes 492A and 492B is electrically connected to the wiring 77 at a bonding portion with the substrate 2 and each of the fixed monitor electrodes 493A and 493B is electrically connected to the wiring 78 at the bonding portion with the substrate 2. With this configuration, it is possible to electrically connect the fixed monitor electrodes more easily and reliably.

The physical quantity sensor 1 of the second embodiment has been described as above. In such a physical quantity sensor 1, as described above, the movable detection electrode 441A (441B) includes the openings 448A and 449A (448B and 449B), and fixed monitor electrodes 492A and 493A (492B and 493B) are disposed inside the openings 448A and 449A (448B and 449B). With this configuration, it is possible to reduce the size of the element portion 4.

As described above, the substrate 2 is open to the upper surface (main surface on the side of the movable bodies 4A and 4B) and includes the concave portion 21 disposed to overlap the movable bodies 4A and 4B in plan view from the Z-axis direction (plan view of the substrate 2). The fixed monitor electrodes 492A, 493A, 492B, and 493B are fixed to the upper surface of the substrate 2 on the outside of the concave portion 21. For that reason, the fixed monitor electrodes 492A, 493A, 492B, and 493B and the substrate 2 can be more reliably bonded with the strength as designed. The fixed monitor electrodes 492A, 493A, 492B, and 493B and the wirings 77 and 78 can be more reliably electrically connected. In particular, in the second embodiment, since the openings 448A and 449A are open at both end portions in the Y-axis direction of the movable detection electrode 441A, the support portions 4921A and 4931A of the fixed monitor electrodes 492A and 493A can be extended to the outside of the concave portion 21 without being obstructed by the detection spring 46A. Similarly, since the openings 448B and 449B are open at both end portions in the Y-axis direction of the movable detection electrode 441B, the support portions 4921B and 4931B of the fixed monitor electrodes 492B and 493B can be extended to the outside of the concave portion 21 without being obstructed by the detection spring 46B.

The physical quantity sensor 1 of the second embodiment has been described as above. Even with such a second embodiment, it is possible to achieve the same effects as those of the first embodiment described above.

Third Embodiment

Next, a physical quantity sensor according to a third embodiment will be described.

Figure 7:
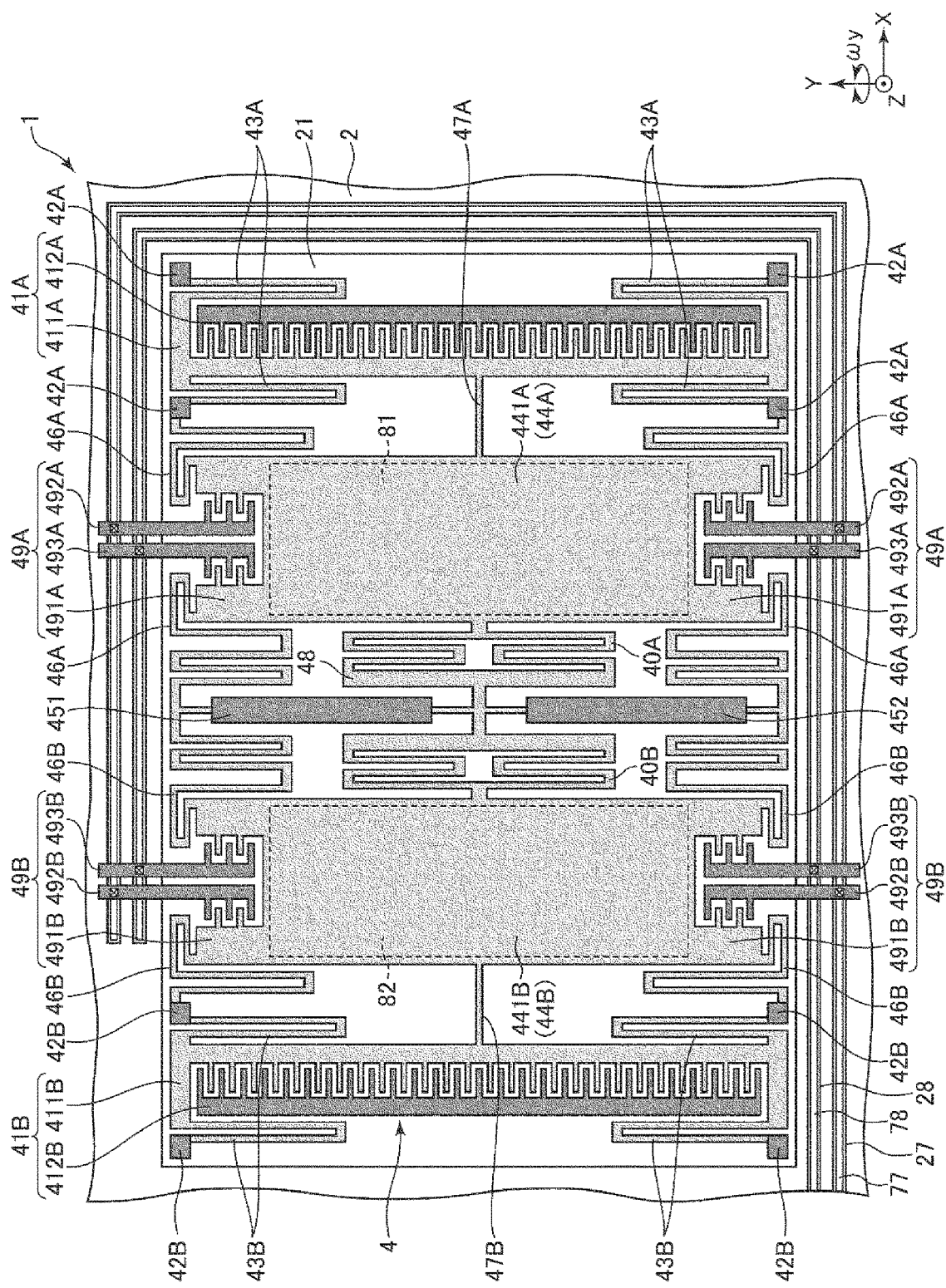
FIG. 7 is a plan view illustrating an element portion of a physical quantity sensor according to a third embodiment of the invention.
Figure 8:
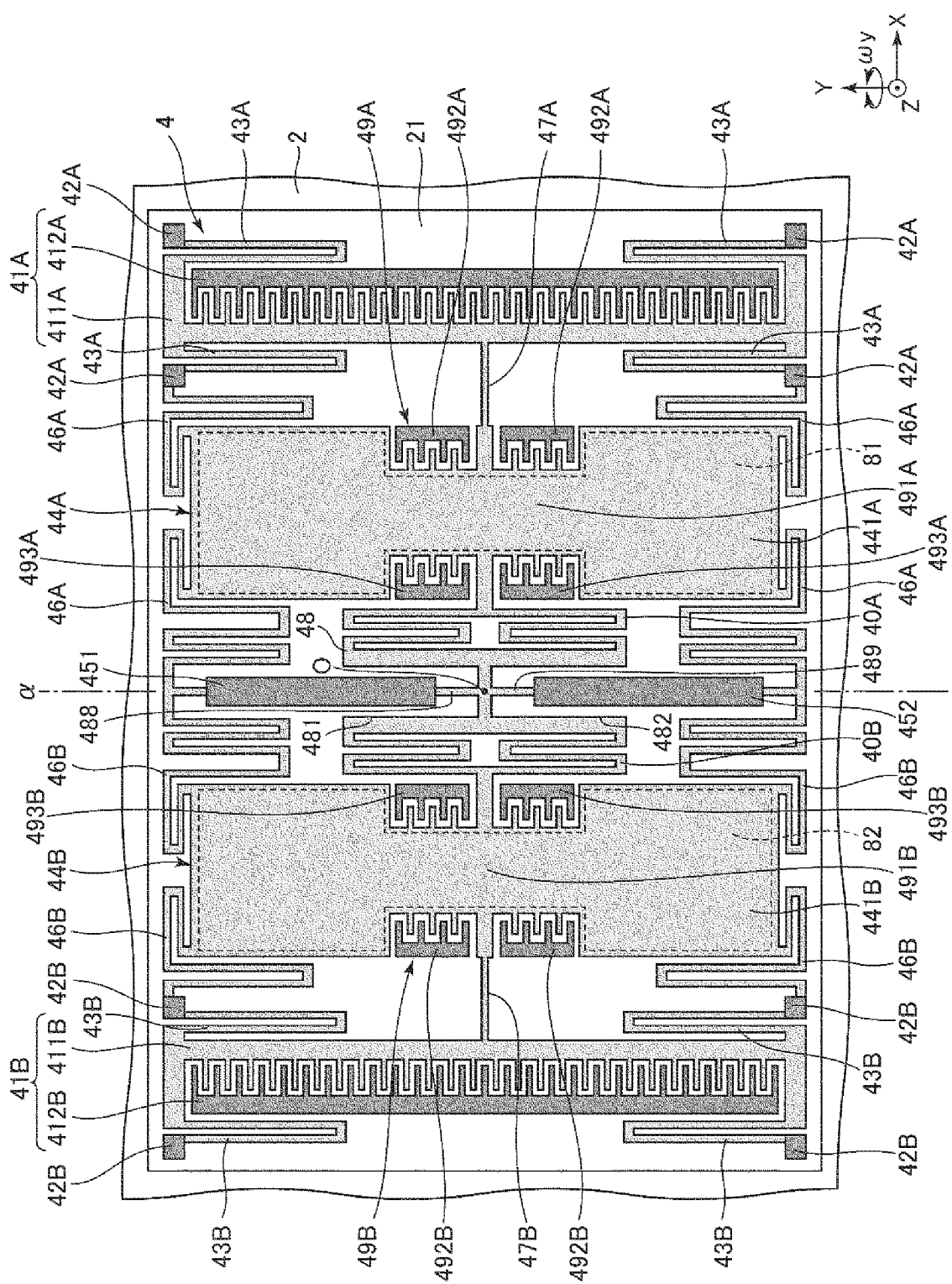
FIG. 8 is a plan view illustrating a modification example of the element portion illustrated in FIG. 7.

FIG. 7 is a plan view illustrating an element portion of a physical quantity sensor according to a third embodiment of the invention. FIG. 8 is a plan view illustrating a modification example of the element portion illustrated in FIG. 7.

The physical quantity sensor 1 according to the third embodiment is mainly the same as the physical quantity sensor 1 according to the second embodiment described above except that the configuration of the element portion 4 is different.

In the following description, regarding the physical quantity sensor 1 of the third embodiment, description will be mainly made on the differences from the second embodiment described above, and description of similar matters will be omitted. In FIG. 7, the same reference numerals are given to the same configurations as those of the second embodiment described above.

The physical quantity sensor 1 illustrated in FIG. 7 is an angular velocity sensor capable of measuring the angular velocity ωy about the Y-axis. In such a physical quantity sensor 1, the fixed detection electrodes 442A, 443A, 442B, and 443B are omitted from the configuration of the second embodiment described above, the detection portion 44A is constituted by the plate-shaped movable detection electrode 441A and the detection portion 44B is constituted by the plate-shaped movable detection electrode 441B. In addition, in accordance with this, the mount 223 is omitted from the configuration of the described above second embodiment.

Instead, the physical quantity sensor 1 includes a fixed detection electrode 81 which is disposed on the bottom surface of the concave portion 21 and disposed opposite to the movable detection electrode 441A, and a fixed detection electrode 82 which is disposed on the bottom surface of the concave portion 21 and disposed opposite to the movable detection electrode 441B. Although not illustrated, the fixed detection electrode 81 is electrically connected to the wiring 75 and the fixed detection electrode 82 is electrically connected to the wiring 76. When the physical quantity sensor 1 is driven, the electrostatic capacitance Ca is formed between the movable detection electrode 441A and the fixed detection electrode 81 and the electrostatic capacitance Cb is formed between the movable detection electrode 441A and the fixed detection electrode 82.

With such a configuration, when the angular velocity ωy is applied to the physical quantity sensor 1 while being driven in the drive vibration mode, the movable detection electrode vibrates in opposite phase in the Z-axis direction due to the Coriolis force. For that reason, the gap between the movable detection electrode 441A and the fixed detection electrode 81 and the gap between the movable detection electrode 441B and the fixed detection electrode 82 change, respectively, and the electrostatic capacitances Ca and Cb change according to the gap change. Accordingly, the angular velocity ωy can be obtained based on changes in the electrostatic capacitances Ca and Cb.

The physical quantity sensor 1 of the third embodiment has been described as above. Even with such a third embodiment, it is possible to achieve the same effects as those of the second embodiment described above. The third embodiment can be combined with the first embodiment as illustrated in FIG. 8. Even with such a configuration, it is possible to achieve the same effect as the third embodiment.

Fourth Embodiment

Next, an inertia measurement device according to a fourth embodiment will be described.

Figure 9:
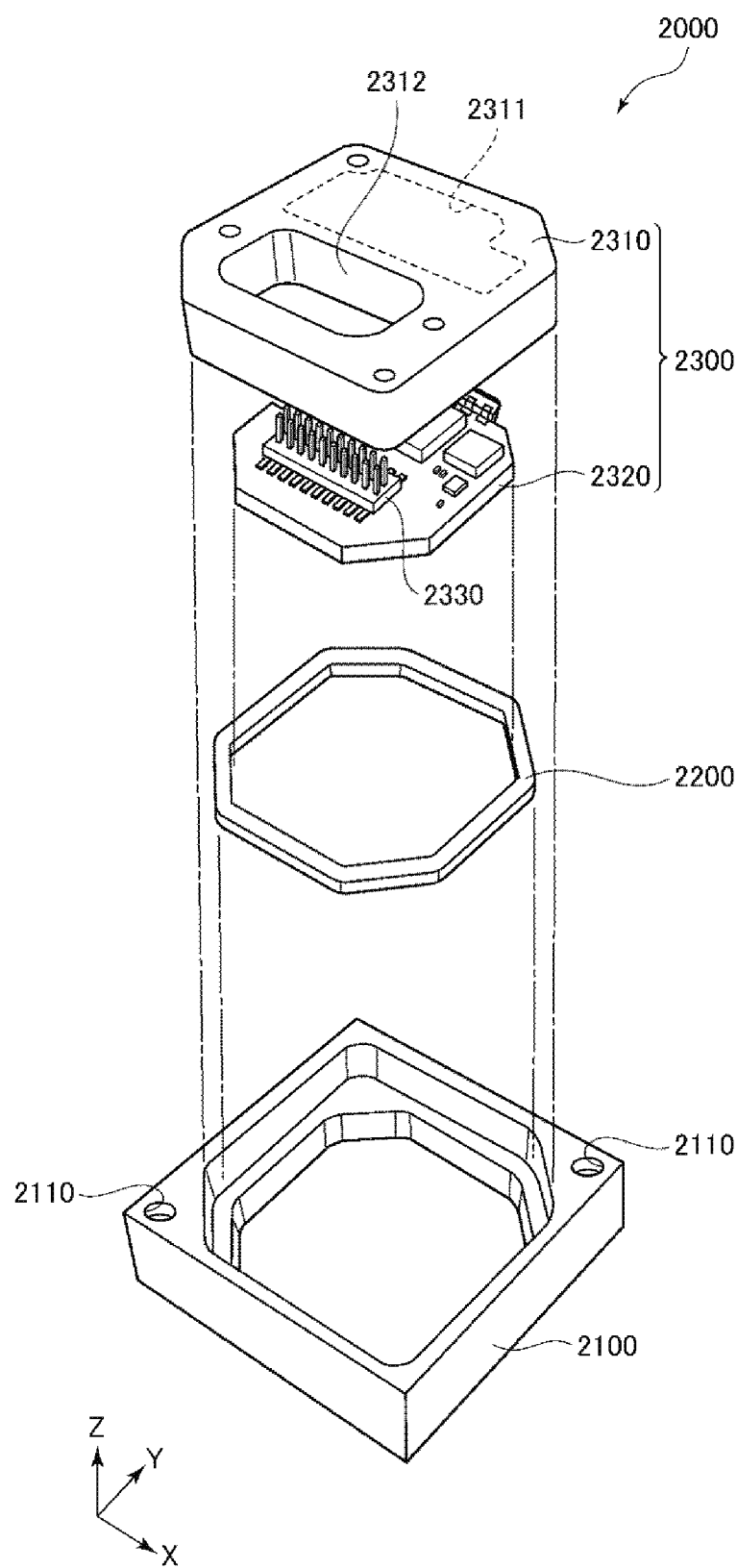
FIG. 9 is an exploded perspective view of an inertia measurement device according to a fourth embodiment of the invention.
Figure 10:
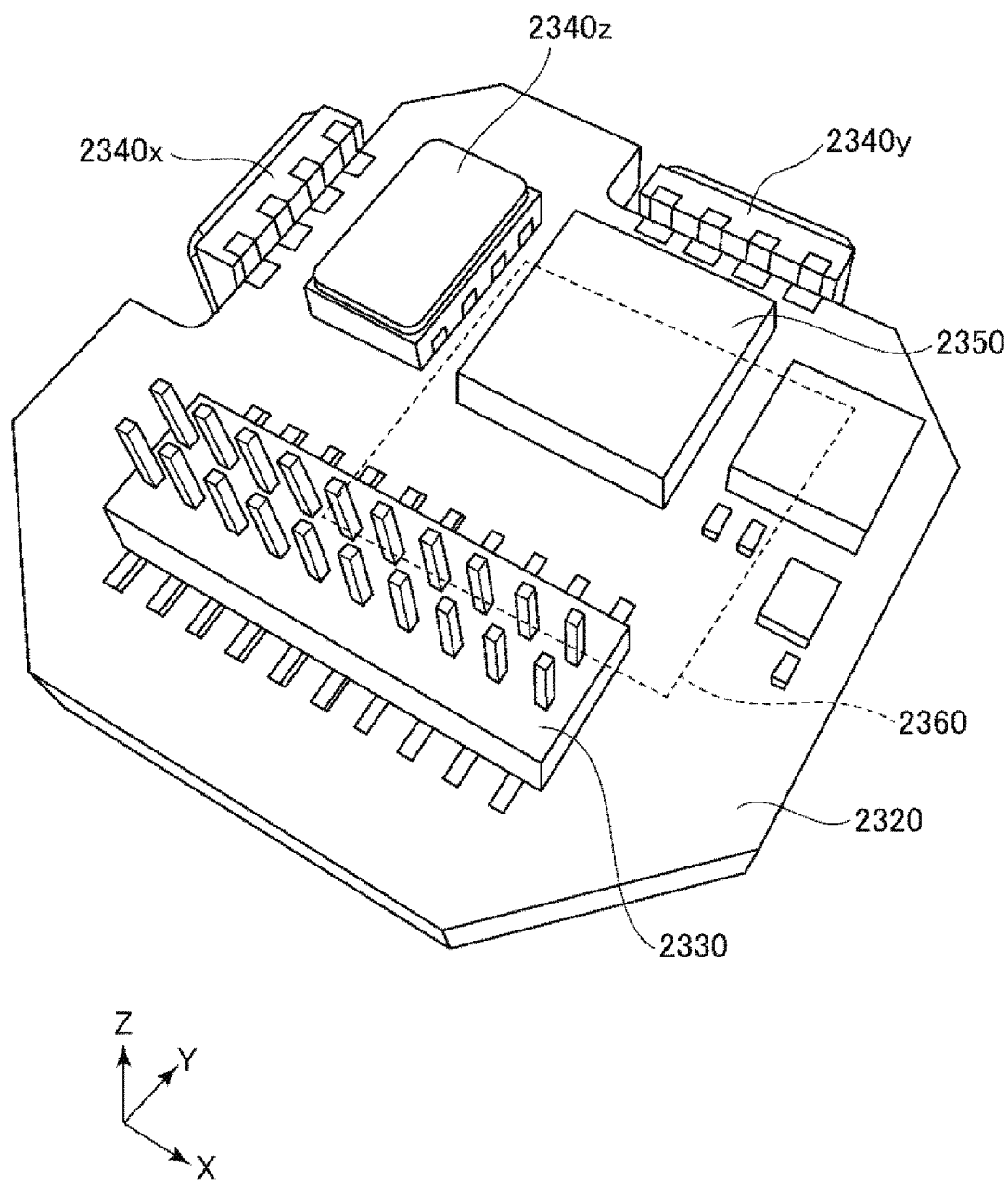
FIG. 10 is a perspective view of a substrate included in the inertia measurement device illustrated in FIG. 9.

FIG. 9 is an exploded perspective view of an inertia measurement device according to a fourth embodiment. FIG. 10 is a perspective view of a substrate included in the inertia measurement device illustrated in FIG. 9.

The inertia measurement device 2000 (IMU: Inertial Measurement Unit) illustrated in FIG. 9 is a device that detects the attitude and behavior (inertial momentum) of a locomotor (mounted device) such as an automobile or a robot. The inertia measurement device 2000 functions as a so-called six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced such that the device can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Further, the sensor module 2300 includes an inner case 2310 and a substrate 2320.

Similarly to the overall shape of the inertia measurement device 2000, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

The inner case 2310 is a member for supporting the substrate 2320, and has a shape so as to fit inside the outer case 2100. A concave portion 2311 for preventing contact with the substrate 2320 and an opening 2312 for exposing a connector 2330 described later are formed in the inner case 2310. Such an inner case 2310 is bonded to the outer case 2100 via the bonding member 2200 (for example, a packing impregnated with adhesive). The substrate 2320 is bonded to the lower surface of the inner case 2310 via an adhesive.

As illustrated in FIG. 10, a connector 2330, an angular velocity sensor 2340z for measuring the angular velocity around the Z-axis, an acceleration sensor 2350 for measuring acceleration in each axis directions of the X-axis, the Y-axis, and the Z-axis and the like are mounted on the upper surface of the substrate 2320. An angular velocity sensor 2340x for measuring the angular velocity about the X-axis and an angular velocity sensor 2340y for measuring the angular velocity around the Y-axis are mounted on the side surface of the substrate 2320. The angular velocity sensors 2340z, 2340x, and 2340y are not particularly limited, and for example, a vibration gyro sensor using a Coriolis force can be used. In particular, any one of the configurations of the first to fourth embodiments described above can be used for measuring the angular velocity in the Z-axis direction. The acceleration sensor 2350 is not particularly limited, and for example, a capacitance type acceleration sensor can be used.

A control IC 2360 is mounted on the lower surface of the substrate 2320. The control IC 2360 is a micro controller unit (MCU), which includes a storing unit including a nonvolatile memory, an A/D converter, and the like, and controls each unit of the inertia measurement device 2000. In the storing unit, programs defining the order and contents for measuring the acceleration and angular velocity, programs for digitizing detected data and incorporating the detected data into packet data, accompanying data, and the like are stored. A plurality of electronic components are mounted on the substrate 2320 in addition to the control IC 2360.

The inertia measurement device 2000 (inertia measurement device) has been described as above. Such an inertia measurement device 2000 includes the angular velocity sensors 2340z, 2340x, and 2340y and the acceleration sensors 2350 as the physical quantity sensor, and the control IC 2360 (control circuit) for controlling driving of each of these sensors 2340z, 2340x, 2340y, and 2350. With this configuration, the effect of the physical quantity sensor according to the invention can be achieved, and the inertia measurement device 2000 with high reliability can be obtained.

Fifth Embodiment

Next, a vehicle positioning device according to a fifth embodiment will be described.

Figure 11:
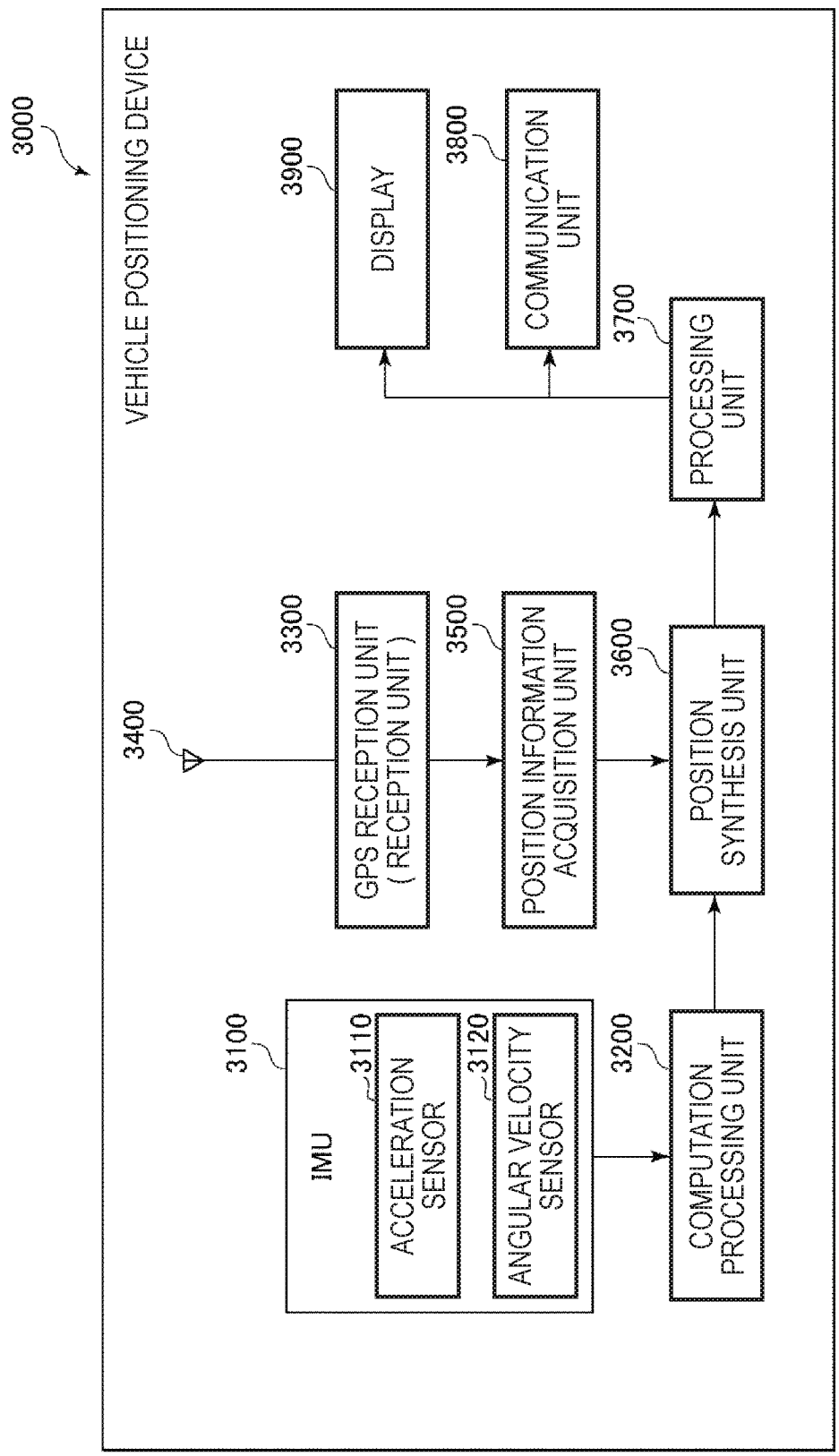
FIG. 11 is a block diagram illustrating an overall system of a vehicle positioning device according to a fifth embodiment of the invention.
Figure 12:
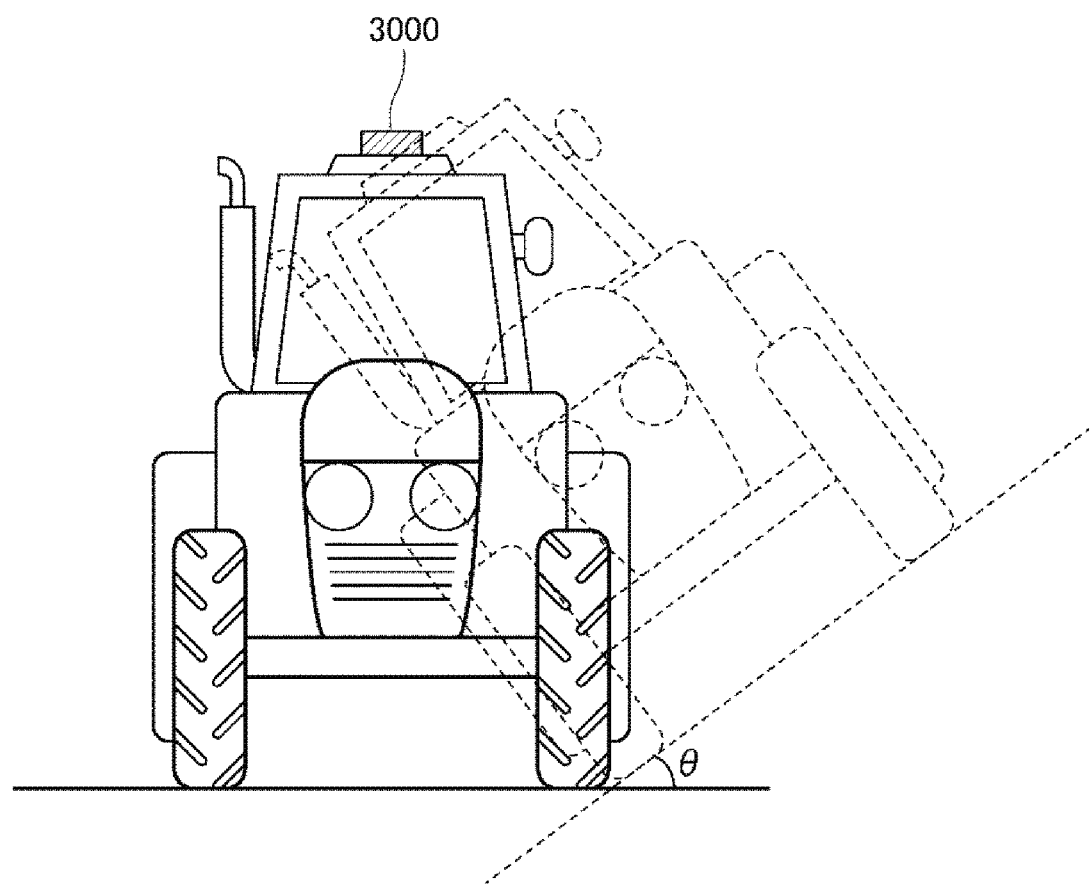
FIG. 12 is a diagram illustrating the operation of the vehicle positioning device illustrated in FIG. 11.

FIG. 11 is a block diagram illustrating the entire system of a vehicle positioning device according to a fifth embodiment. FIG. 12 is a diagram illustrating the operation of the vehicle positioning device illustrated in FIG. 11.

A vehicle positioning device 3000 illustrated in FIG. 11 is a device which is used by being mounted on a vehicle and performs positioning of the vehicle. The vehicle is not particularly limited, and may be any of a bicycle, an automobile (including a four-wheeled automobile and a motorcycle), a train, an airplane, a ship, and the like, but in the fifth embodiment, the vehicle is described as a four-wheeled automobile. The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 of the fourth embodiment described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data (data including acceleration and attitude of the vehicle).

The GPS reception unit 3300 receives a signal (GPS carrier wave, satellite signal on which position information is superimposed) from the GPS satellite via the receiving antenna 3400. Further, the position information acquisition unit 3500 outputs GPS positioning data representing the position (latitude, longitude, altitude), speed, direction of the vehicle positioning device 3000 (vehicle) based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 12, if the attitude of the vehicle is different due to the influence of inclination of the ground or the like, this means that the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data (in particular, data on the attitude of the vehicle). This determination can be made comparatively easily by computation using a trigonometric function (inclination θ with respect to the vertical direction).

The position data output from the position synthesis unit 3600 is subjected to predetermined processing by the processing unit 3700 and displayed on the display 3900 as a positioning result. Further, the position data may be transmitted to the external device by the communication unit 3800.

The vehicle positioning device 3000 has been described as above. As described above, such a vehicle positioning device 3000 includes the inertia measurement device 3100, the GPS reception unit 3300 (reception unit) that receives a satellite signal on which position information is superimposed from a positioning satellite, the position information acquisition unit 3500 (acquisition unit) that acquires position information of the GPS reception unit 3300 based on the received satellite signal, the computation processing unit 3200 (computation unit) that computes the attitude of the vehicle based on the inertial navigation positioning data (inertia data) output from the inertia measurement device 3100, and the position synthesis unit 3600 (calculation unit) that calculates the position of the vehicle by correcting position information based on the calculated attitude. With this configuration, the effect of the inertia measurement device according to the invention can be achieved, and the vehicle positioning device 3000 with high reliability can be obtained.

Sixth Embodiment

Next, an electronic apparatus according to a sixth embodiment will be described.

Figure 13:
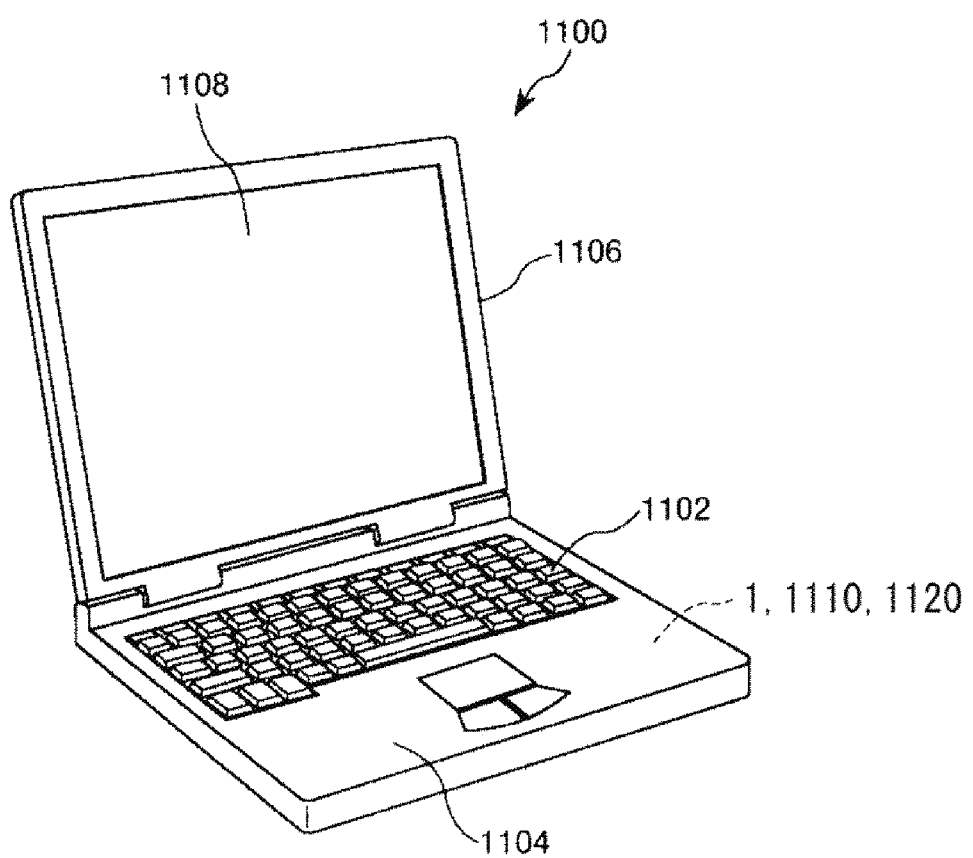
FIG. 13 is a perspective view illustrating an electronic apparatus according to a sixth embodiment of the invention.

FIG. 13 is a perspective view illustrating an electronic apparatus according to a sixth embodiment.

The mobile type (or notebook type) personal computer 1100 illustrated in FIG. 13 is a personal computer to which the electronic apparatus according to the invention is applied. In FIG. 13, the personal computer 1100 is constituted with a main body 1104 including a keyboard 1102 and a display unit 1106 including a display 1108, and the display unit 1106 is supported so as to be rotatable with respect to the main body 1104 via a hinge structure.

In such a personal computer 1100, the physical quantity sensor 1, a control circuit 1110 for controlling driving of the physical quantity sensor 1, a correction circuit 1120 for correcting the physical quantity detected by the physical quantity sensor 1, for example, based on environmental temperature, are built in. The physical quantity sensor 1 is not particularly limited, but any of the embodiments described above can be used, for example.

Such a personal computer 1100 (electronic apparatus) includes the physical quantity sensor 1, the control circuit 1110, and the correction circuit 1120. For that reason, the effect of the physical quantity sensor 1 described above can be achieved and high reliability can be exhibited.

Seventh Embodiment

Next, an electronic apparatus according to a seventh embodiment of the invention will be described.

Figure 14:
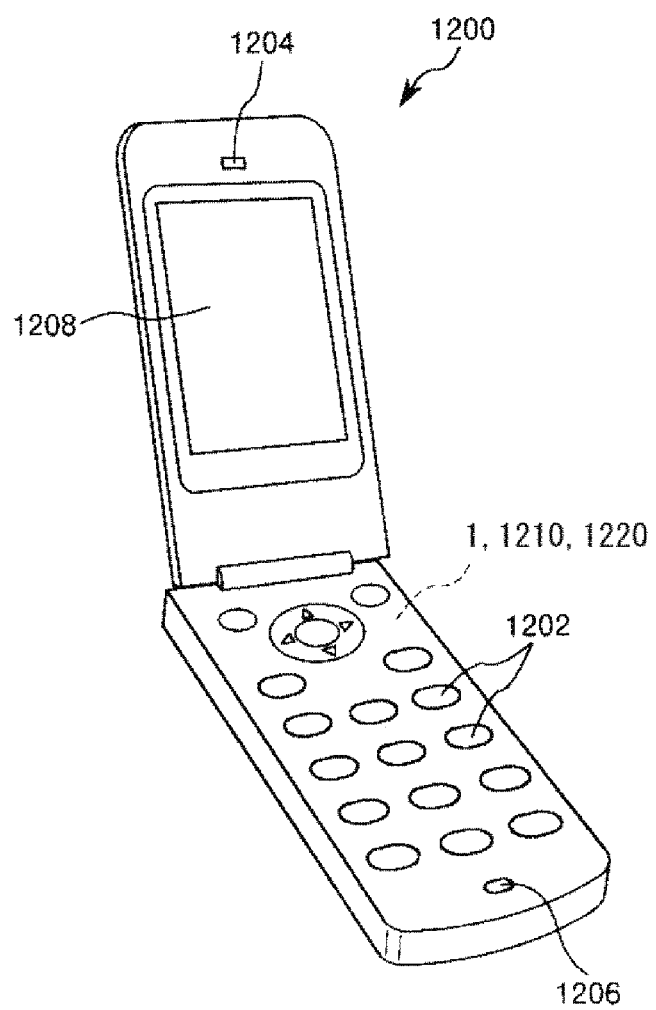
FIG. 14 is a perspective view illustrating an electronic apparatus according to a seventh embodiment of the invention.

FIG. 14 is a perspective view illustrating an electronic apparatus according to a seventh embodiment.

The mobile phone 1200 (including PHS) illustrated in FIG. 14 is a mobile phone to which the electronic apparatus according to the invention is applied. In FIG. 14, the mobile phone 1200 includes an antenna (not illustrated), a plurality of operation buttons 1202, an earpiece 1204, and a mouthpiece 1206, and a display 1208 is disposed between the operation button 1202 and the earpiece 1204.

In such a mobile phone 1200, the physical quantity sensor 1, a control circuit 1210 for controlling driving of the physical quantity sensor 1, a correction circuit 1220 for correcting the physical quantity detected by the physical quantity sensor 1, for example, based on environmental temperature, are built in. The physical quantity sensor 1 is not particularly limited, but any of the embodiments described above can be used, for example.

Such a mobile phone 1200 (electronic apparatus) includes the physical quantity sensor 1, the control circuit 1210, and the correction circuit 1220. For that reason, the effect of the physical quantity sensor 1 described above can be achieved and high reliability can be exhibited.

Eighth Embodiment

Next, an electronic apparatus according to an eighth embodiment of the invention will be described.

Figure 15:
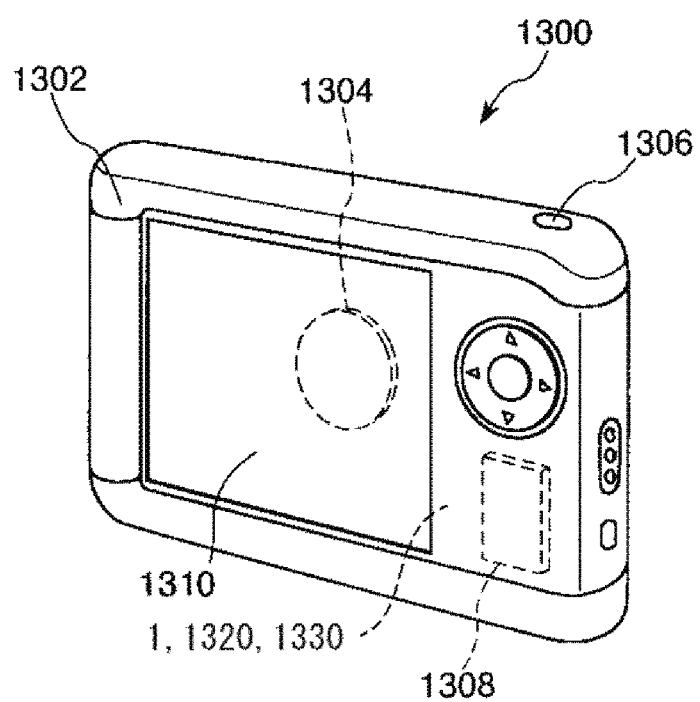
FIG. 15 is a perspective view illustrating an electronic apparatus according to an eighth embodiment of the invention.

FIG. 15 is a perspective view illustrating an electronic apparatus according to an eighth embodiment.

A digital still camera 1300 illustrated in FIG. 15 is a digital still camera to which the electronic apparatus according to the invention is applied. In FIG. 15, a display 1310 is provided on the rear surface of a case 1302, the display 1310 is configured to perform display, and, based on an imaging signal from the CCD, the display 1310 functions as a viewfinder for displaying a subject as an electronic image. A light reception unit 1304 including an optical lens (imaging optical system) and a CCD or the like is provided on the front side (back side in the figure) of the case 1302. When a photographer confirms a subject image displayed on the display 1310 and presses a shutter button 1306, the imaging signal of the CCD at that time is transferred to and stored in the memory 1308.

In such a digital still camera 1300, the physical quantity sensor 1, a control circuit 1320 for controlling driving of the physical quantity sensor 1, a correction circuit 1330 for correcting the physical quantity detected by the physical quantity sensor 1, for example, based on environment temperature, are built in. The physical quantity sensor 1 is not particularly limited, but any of the embodiments described above can be used, for example.

Such a digital still camera 1300 (electronic apparatus) includes the physical quantity sensor 1, the control circuit 1320, and the correction circuit 1330. For that reason, the effect of the physical quantity sensor 1 described above can be achieved and high reliability can be exhibited.

In addition to the personal computer and mobile phone of the embodiments described above and the digital still camera of the eighth embodiment, the electronic apparatus according to the invention can be applied to, for example, a smartphone, a tablet terminal, a clock (including a smart watch), an ink jet type discharging device (for example, an ink jet printer), a laptop personal computer, a TV, a wearable terminals such as an HMD (head mounted display), a video camera, a video tape recorder, a car navigation device, a pager, an electronic datebook (including a datebook with communication function), an electronic dictionary, a calculator, an electronic game machines, a word processor, a work station, a videophone, a security TV monitor, electronic binoculars, a POS terminal, medical equipment (for example, an electronic clinical thermometer, a blood pressure manometer, a blood glucose meter, an electrocardiogram measurement device, a ultrasonic diagnostic device, an electronic endoscope), a fish finder, various measuring instruments, mobile terminal base station equipment, instruments (for example, instruments of vehicles, aircraft, and ships), a flight simulator, a network server, and the like.

Ninth Embodiment

Next, a vehicle according to a ninth embodiment of the invention will be described.

Figure 16:
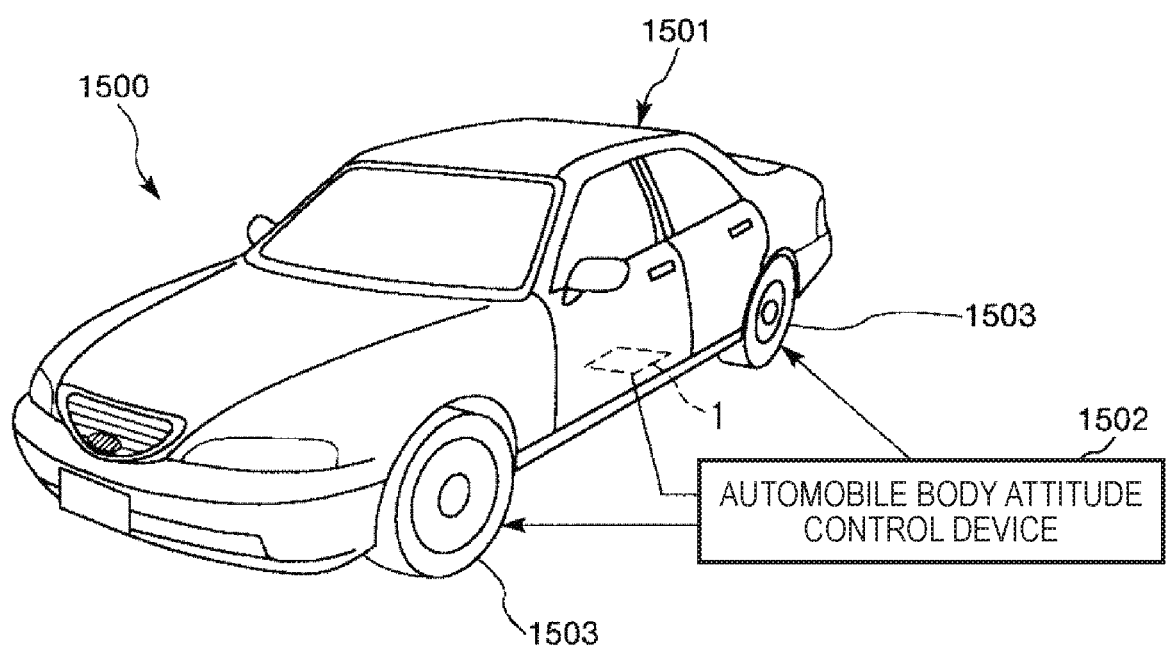
FIG. 16 is a perspective view illustrating a vehicle according to a ninth embodiment of the invention.

FIG. 16 is a perspective view illustrating a vehicle according to a ninth embodiment of the invention.

The automobile 1500 illustrated in FIG. 16 is an automobile to which the vehicle according to the invention is applied. In FIG. 16, the physical quantity sensor 1 is built in the automobile 1500, and the attitude of the automobile body 1501 can be detected by the physical quantity sensor 1. The detection signal of the physical quantity sensor 1 is supplied to an automobile body attitude control device 1502 (attitude control unit), and the automobile body attitude control device 1502 detects the attitude of the automobile body 1501 based on the signal, and can control hardness of the suspension or control the brakes of individual wheels 1503 according to the detected result. Here, as the physical quantity sensor 1, for example, the same as each of the embodiments described above can be used.

Such an automobile 1500 (vehicle) includes the physical quantity sensor 1 and the automobile body attitude control device 1502 (attitude control unit). For that reason, the effect of the physical quantity sensor 1 described above can be achieved, and high reliability can be exhibited.

The physical quantity sensor 1 can also be widely applied to a car navigation system, a car air conditioner, an anti-lock braking system (ABS), an air bag, a tire pressure monitoring system (TPMS), an engine controller, and an electronic control unit (ECU) such as a battery monitor of a hybrid car or an electric automobile.

Also, the vehicle is not limited to the automobile 1500, but can also be an airplane, a rocket, a satellite, a ship, an automated guided vehicle (AGV), a biped walking robot, an unmanned airplane such as a drone, and the like.

Although the physical quantity sensor, the inertia measurement device, the vehicle positioning device, the electronic apparatus, and the vehicle according to the invention have been described based on the illustrated embodiments, the invention is not limited thereto. The configuration of each unit can be replaced with any configuration having the same function. In addition, any other constituent element may be added to the invention. Further, the embodiments described above may be appropriately combined.

In the embodiments described above, the physical quantity sensor that measures the angular velocity has been described, but is not limited thereto. The physical quantity sensor may be one that detects acceleration, for example. Alternatively, physical quantity sensor may be one that detects both acceleration and angular velocity.

What is claimed is:
1. A physical quantity sensor comprising:
a substrate;
an element portion that includes first and second fixed portions and a movable body, the movably body including a movable drive electrode, a movable detection electrode, and a connection portion for connecting the movable drive electrode and the movable detection electrode and is allowed to vibrate along a first axis with respect to the substrate, the first and second fixed portions being fixed to the substrate;

a fixed drive electrode that is fixed to the substrate, is disposed to face the movable drive electrode, and vibrates the movable body along the first axis; and a fixed monitor electrode that is fixed to the substrate, is disposed to face the movable detection electrode, and detects vibration of the movable body along the first axis, wherein the element portion has a center point, the first and second fixed portions being located adjacent to the center point, and the first and second fixed portions are arranged along a second axis perpendicular to the first axis and sandwich the center point therebetween, the movable drive electrode, the movable detection electrode, and the connection portion are located laterally to the center point and to the first and second fixed portions of the element portion, the connection portion is a beam extending on a line that extends along the first axis and that intersects [[the center mass of the movable body]] the center point, and the connection portion has a first end and a second end opposite to each other along the first axis, the movable drive electrode is configured with a first bar and a plurality of drive teeth, the first bar extends along the second axis, and the plurality of drive teeth extend from the first bar along the first axis, the movable detection electrode is configured with a second bar and a plurality of detection teeth, the second bar extends along the second axis, and the plurality of detection teeth extend from the second bar along the first axis, and the first end of the connection portion is connected to the first bar, and the second end of the connection portion is connected to the second bar.

2. The physical quantity sensor according to claim 1, further comprising:

a movable monitor electrode that is disposed on the movable detection electrode and forms an electrostatic capacitance with the fixed monitor electrode.

3. The physical quantity sensor according to claim 2, wherein the fixed monitor electrode includes a first fixed monitor electrode and a second fixed monitor electrode, and when the movable body vibrates along the first axis, a gap between the movable monitor electrode and the first fixed monitor electrode and a gap between the movable monitor electrode and the second fixed monitor electrode change in opposite phases.

4. An inertia measurement device comprising:
the physical quantity sensor according to claim 3; and
a control circuit that controls driving of the physical quantity sensor.

5. An electronic apparatus comprising:
the physical quantity sensor according to claim 3;
a control circuit; and
a correction circuit.

6. A vehicle comprising:
the physical quantity sensor according to claim 3; and
an attitude control unit.

7. An inertia measurement device comprising:
the physical quantity sensor according to claim 2; and
a control circuit that controls driving of the physical quantity sensor.

8. An electronic apparatus comprising:
the physical quantity sensor according to claim 2;
a control circuit; and
a correction circuit.

9. The physical quantity sensor according to claim 2; and
an attitude control unit.

10. The physical quantity sensor according to claim 1, wherein the fixed monitor electrode is disposed outside the movable detection electrode.

11. An inertia measurement device comprising:
the physical quantity sensor according to claim 4; and
a control circuit that controls driving of the physical quantity sensor.

12. An electronic apparatus comprising:
the physical quantity sensor according to claim 10;
a control circuit; and
a correction circuit.

13. The physical quantity sensor according to claim 1, wherein the movable detection electrode includes an opening, and the fixed monitor electrode is disposed inside the opening.

14. The physical quantity sensor according to claim 1, wherein the movable drive electrode is disposed between the fixed drive electrode and the fixed monitor electrode.

15. The physical quantity sensor according to claim 14, wherein a constant voltage is applied to the movable body.

16. The physical quantity sensor according to claim 1, wherein the substrate includes a concave portion that is open to a main surface on a side of the movable body and is disposed to be overlapped with the movable body in a plan view of the substrate, and the fixed monitor electrode is fixed to the main surface on an outside of the concave portion.

17. An inertia measurement device comprising:
the physical quantity sensor according to claim 1; and
a control circuit that controls driving of the physical quantity sensor.

18. A vehicle positioning device comprising:
the inertia measurement device according to claim 9;
a reception unit that receives a satellite signal on which position information is superimposed from a positioning satellite;
an acquisition unit that acquires position information of the reception unit based on the received satellite signal;
a computation unit that computes an attitude of the vehicle based on inertia data output from the inertia measurement device; and
a calculation unit that calculates a position of the vehicle by correcting the position information based on the calculated attitude.

19. An electronic apparatus comprising:
the physical quantity sensor according to claim 1;
a control circuit; and
a correction circuit.

20. A vehicle comprising:
the physical quantity sensor according to claim 1; and
an attitude control unit.

* * * * *